(12) United States Patent
Schneider et al.

(10) Patent No.: US 11,724,965 B2
(45) Date of Patent: Aug. 15, 2023

(54) GLASS-BASED ARTICLES HAVING HIGH STRESS MAGNITUDE AT DEPTH

(71) Applicant: CORNING INCORPORATED, Corning, NY (US)

(72) Inventors: Vitor Marino Schneider, Painted Post, NY (US); Trevor Edward Wilantewicz, Sunnyvale, CA (US)

(73) Assignee: Corning Incorporated, Corning, NY (US)

( * ) Notice: Subject to any disclaimer, the term of this patent is extended or adjusted under 35 U.S.C. 154(b) by 474 days.

(21) Appl. No.: 16/964,442

(22) PCT Filed: Jan. 23, 2019

(86) PCT No.: PCT/US2019/014838
§ 371 (c)(1),
(2) Date: Jul. 23, 2020

(87) PCT Pub. No.: WO2019/147733
PCT Pub. Date: Aug. 1, 2019

(65) Prior Publication Data
US 2021/0047237 A1 Feb. 18, 2021

Related U.S. Application Data

(60) Provisional application No. 62/621,241, filed on Jan. 24, 2018.

(51) Int. Cl.
*C03C 21/00* (2006.01)
*C03C 3/087* (2006.01)
(Continued)

(52) U.S. Cl.
CPC ............ *C03C 21/002* (2013.01); *C03C 3/085* (2013.01); *C03C 17/002* (2013.01); *C03C 2217/78* (2013.01)

(58) Field of Classification Search
None
See application file for complete search history.

(56) References Cited

U.S. PATENT DOCUMENTS

| 6,472,068 B1 | 10/2002 | Glass et al. |
| 6,516,634 B1 | 2/2003 | Green et al. |

(Continued)

FOREIGN PATENT DOCUMENTS

| AU | 2011212982 A1 | 8/2012 |
| CN | 101689376 A | 3/2010 |

(Continued)

OTHER PUBLICATIONS

Japanese Patent Application No. 2020-540793, Office Action dated Mar. 17, 2022, 6 pages (3 pages of English Translation and 3 pages of Original Document), Japanese Patent Office.

(Continued)

*Primary Examiner* — David Sample
(74) *Attorney, Agent, or Firm* — Jeffrey A. Schmidt

(57) ABSTRACT

Glass-based articles have a first surface and a second surface opposing the first surface defining a thickness (t) and a center between the first surface and the second surface, the glass-based article containing $Li_2O$, ion-exchanged potassium and ion-exchanged sodium. The glass-based article has a stress profile including a hump stress region extending from the first surface (or a point below the first surface) to an apex in a range of 0.001·t and 0.1·t. Compressive stress at the apex is from 25 to 750 MPa. The hump region comprises an area of increasing stress and an area of decreasing stress. Depth of compression is from 0.1·t to 0.25·t. A tensile stress region extends from the depth of compression to a maximum tensile stress.

20 Claims, 14 Drawing Sheets

(51) Int. Cl.
*C03C 17/00* (2006.01)
*C03C 3/085* (2006.01)

(56) References Cited

U.S. PATENT DOCUMENTS

| | | | |
|---|---|---|---|
| 8,193,128 | B2 | 6/2012 | Hellmann et al. |
| 8,783,063 | B2 | 7/2014 | Osakabe et al. |
| 8,854,623 | B2 | 10/2014 | Fontaine et al. |
| 8,950,215 | B2 | 2/2015 | Rappoport et al. |
| 9,140,543 | B1 | 9/2015 | Allan et al. |
| 9,359,251 | B2 | 6/2016 | Bookbinder et al. |
| 2005/0250639 | A1 | 11/2005 | Siebers et al. |
| 2009/0220761 | A1 | 9/2009 | Dejneka et al. |
| 2010/0190038 | A1 | 7/2010 | Osakabe et al. |
| 2010/0326657 | A1 | 12/2010 | Hellmann et al. |
| 2012/0088067 | A1 | 4/2012 | Rappoport et al. |
| 2012/0135153 | A1 | 5/2012 | Osakabe et al. |
| 2012/0194974 | A1 | 8/2012 | Weber et al. |
| 2012/0216565 | A1 | 8/2012 | Allan et al. |
| 2012/0216569 | A1 | 8/2012 | Allan et al. |
| 2013/0236666 | A1 | 9/2013 | Bookbinder et al. |
| 2014/0227524 | A1 | 8/2014 | Ellison et al. |
| 2015/0030834 | A1 | 1/2015 | Morey et al. |
| 2015/0147574 | A1 | 5/2015 | Allan et al. |
| 2015/0166407 | A1 | 6/2015 | Varshneya et al. |
| 2016/0122239 | A1 | 5/2016 | Amin et al. |
| 2017/0158556 | A1 | 6/2017 | Dejneka et al. |
| 2017/0282503 | A1 | 10/2017 | Peng et al. |
| 2017/0295657 | A1 | 10/2017 | Gross et al. |
| 2017/0355640 | A1 | 12/2017 | Schneider et al. |
| 2018/0230044 | A1 | 8/2018 | Ozeki et al. |
| 2021/0323862 | A1* | 10/2021 | Kanehara ............... C03C 4/02 |
| 2021/0371332 | A1* | 12/2021 | Ichimaru ............... C03C 3/085 |

FOREIGN PATENT DOCUMENTS

| | | | |
|---|---|---|---|
| CN | 102791646 | A | 11/2012 |
| CN | 103097319 | A | 5/2013 |
| CN | 103338926 | A | 10/2013 |
| CN | 106866000 | A | 6/2017 |
| CN | 107265884 | A | 10/2017 |
| CN | 206580739 | U | 10/2017 |
| EP | 1291631 | A1 | 3/2003 |
| EP | 1593658 | A1 | 11/2005 |
| EP | 2531459 | A2 | 12/2012 |
| EP | 2646243 | A1 | 10/2013 |
| JP | 2005-320234 | A | 11/2005 |
| JP | 2011-527661 | | 11/2011 |
| JP | 2013-518800 | A | 5/2013 |
| JP | 2016-538224 | A | 12/2016 |
| JP | 2017-525650 | A | 9/2017 |
| KR | 10-2012-0128657 | A | 11/2012 |
| KR | 10-2014-0002683 | A | 1/2014 |
| KR | 10-2014-0131558 | A | 11/2014 |
| SG | 178005 | | 2/2012 |
| TW | 201335092 | A | 9/2013 |
| TW | 201520178 | A | 6/2015 |
| WO | 2000/047529 | A1 | 8/2000 |
| WO | 2009/041618 | A1 | 4/2009 |
| WO | 2010/147650 | A2 | 12/2010 |
| WO | 2011/097314 | A2 | 8/2011 |
| WO | 2012/074983 | A1 | 6/2012 |
| WO | 2013/116420 | A1 | 8/2013 |
| WO | 2015/077179 | A1 | 5/2015 |
| WO | 2015/127483 | A2 | 8/2015 |
| WO | WO-2017066243 | A1 * | 4/2017 ............. B32B 17/06 |
| WO | 2017/126605 | A1 | 7/2017 |

OTHER PUBLICATIONS

Chinese Patent Application No. 201980020804.9, Office Action dated Mar. 4, 2022, 18 pages (08 pages of English Translation and 10 pages of Original document), Chinese Patent Office.

Bradenburg; "Stress in Ion-Exchanged Glass Waveguides"; Journal of Light wave Technology, vol. LT-4, No. 10, 1986, pp. 1580-1593.

International Search Report and Written Opinion of the International Searching Authority; PCT/US2019/014838; dated May 7, 2019; 13 Pages; European Patent Office.

Mesa; "Spherical and Rounded Cone Nano Indenters"; Micro Star Technologies; 24 Pages; date unknown; www.microstartech.com.

Sane et al; "Stress Buildup and Relaxation During Ion Exchange Strengthening of Glass"; J. Am. Ceram. Soc., vol. 70, No. 2, 1987, pp. 86-89.

Sglavo et al; "Processing of Glasses with Engineered Stress Profiles"; Journal of Non-Crystalline Solids, vol. 344, 2004 pp. 73-78.

Japanese Patent Application No. 2020-540793, Office Action, dated Jan. 4, 2023, 6 pages (3 pages of English Translation and 3 pages of Original Copy); Japanese Patent Office.

* cited by examiner

GLASS-BASED ARTICLES HAVING HIGH STRESS MAGNITUDE AT DEPTH

CROSS-REFERENCE TO RELATED APPLICATIONS

This application is a national stage entry of International Patent Application Serial No. PCT/US2019/014838, filed on Jan. 23, 2019, which in turn, claims the benefit of priority under 35 U.S.C. § 119 of U.S. Provisional Application Ser. No. 62/621,241 filed on Jan. 24, 2018, the contents of each of which are relied upon and incorporated herein by reference in their entireties.

BACKGROUND

This disclosure relates to glass-based articles exhibiting high stress magnitude at depth, and more particularly to glass-based articles containing ion-exchanged sodium and potassium and exhibiting a stress profile with a deep depth of compression including a region of high stress magnitude at depth.

Glass-based articles often experience severe impacts that can introduce large flaws into a surface of such articles. Such flaws can extend to depths of up to about 200 micrometers from the surface. Traditionally, thermally tempered glass has been used to prevent failures caused by the introduction of such flaws into the glass because thermally tempered glass often exhibits large compressive stress (CS) layers (e.g., approximately 21% of the total thickness of the glass), which can prevent the flaws from propagating further into the glass and thus, can prevent failure. An example of a stress profile generated by thermal tempering is shown in FIG. 1. In FIG. 1, the thermally treated glass-based article 100 includes a first surface 101, a thickness $t_1$, and a surface CS 110. The thermally treated glass-based article 100 exhibits a CS that decreases from the first surface 101 to a depth of compression (DOC) 130, as defined herein, at which depth the stress changes from compressive to tensile stress. The tensile stress reaches a maximum central tension (CT) at 120.

Thermal tempering is currently limited to thick glass-based substrates (e.g., glass-based substrates having a thickness $t_1$ of about 3 millimeters or greater) because, to achieve the thermal strengthening and the desired residual stresses, a sufficient thermal gradient must be formed between the core of such articles and the surface. Such thick articles are undesirable or not practical in many applications such as display (e.g., consumer electronics, including mobile phones, tablets, computers, navigation systems, watches, and the like), architecture (e.g., windows, shower panels, countertops etc.), transportation (e.g., automotive, trains, aircraft, sea craft, etc.), appliance, or any application that would benefit from superior fracture resistance but thin and light-weight articles.

Although chemical strengthening is not limited by the thickness of the glass-based substrate in the same manner as thermally tempering, known chemically strengthened glass-based articles do not exhibit the stress profile of thermally tempered glass-based articles. An example of a stress profile generated by chemical strengthening (e.g., by an ion exchange process), is shown in FIG. 2. In FIG. 2, the chemically strengthened glass-based article 200 includes a first surface 201, a thickness $t_2$ and a surface CS 210. The glass-based article 200 exhibits a CS that decreases from the first surface 201 to a DOC 230, and reaches a maximum CT 220. As shown in FIG. 2, such profiles exhibit a substantially flat CT region or CT region with a constant or near constant tensile stress along at least a portion of the CT region. Often, known chemically strengthened glass-based articles exhibit a lower maximum CT value, as compared to the maximum central value shown in FIG. 1.

There is a need for thin glass-based articles that exhibit improved properties, such as resistance to fracture due to dropping of the articles and stable crack growth.

SUMMARY

A first aspect of this disclosure pertains to a glass-based article comprising: a first surface and a second surface opposing the first surface defining a thickness (t) and a center between the first surface and the second surface, the glass-based article comprising $Li_2O$, ion-exchanged potassium and ion-exchanged sodium; and a stress profile comprising a hump stress region extending from the first surface (or a point below the first surface) to an apex in a range of 0.001·t and 0.1·t, a compressive stress at the apex in a range of 25 MPa and 750 MPa (or 25 MPa to 500 MPa), wherein at least one point of the hump stress region between the first surface and the apex comprises a tangent having a slope with a value from 25 MPa/micrometer to 500 MPa/micrometer, a decreasing stress region extending from the apex that decreases such that at least one point of the decreasing stress region extending from the apex toward the center comprises a tangent having a slope with a value from −20 MPa/micrometer to −200 MPa/micrometer until the decreasing stress region reaches a depth of compression where the glass-based article has a stress value of zero, the depth of compression being in a rage of 0.1·t and 0.25·t, and a tensile stress region extending from the depth of compression to a maximum tensile stress, wherein the glass-based article comprises a thickness from 0.01 mm to 3 mm.

Another aspect of this disclosure pertains to a method of making a glass-based article comprising: ion-exchanging sodium and potassium into a glass-based substrate comprising $Li_2O$ in a range of 0.1 mol % and 20 mol %, wherein the glass-based substrate comprises: a first surface and a second surface opposing the first surface defining a thickness (t) (mm) and a center between the first surface and the second surface; and a stress profile comprising a hump stress region extending from the first surface (or a point below the first surface) to an apex in a range of 0.001·t and 0.1·t, a compressive stress at the apex is from 25 MPa to 750 MPa (or 25 MPa to 500 MPa), wherein at least one point of the hump region between the first surface and the apex comprises a tangent having a slope with a value from 25 MPa/micrometer and 500 MPa/micrometer, a decreasing stress region extending from the apex that decreases such that at least one point of the decreasing stress region extending from the apex toward the center comprises a tangent having a slope with a value from −20 MPa/micrometer to −200 MPa/micrometer until the decreasing stress region reaches a depth of compression where the glass-based article has a stress value of zero, the depth of compression being in a rage of 0.1·t and 0.25·t, and a tensile stress region extending from the depth of compression to a maximum tensile stress, wherein the glass-based article comprises a thickness from 0.01 mm to 3 mm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
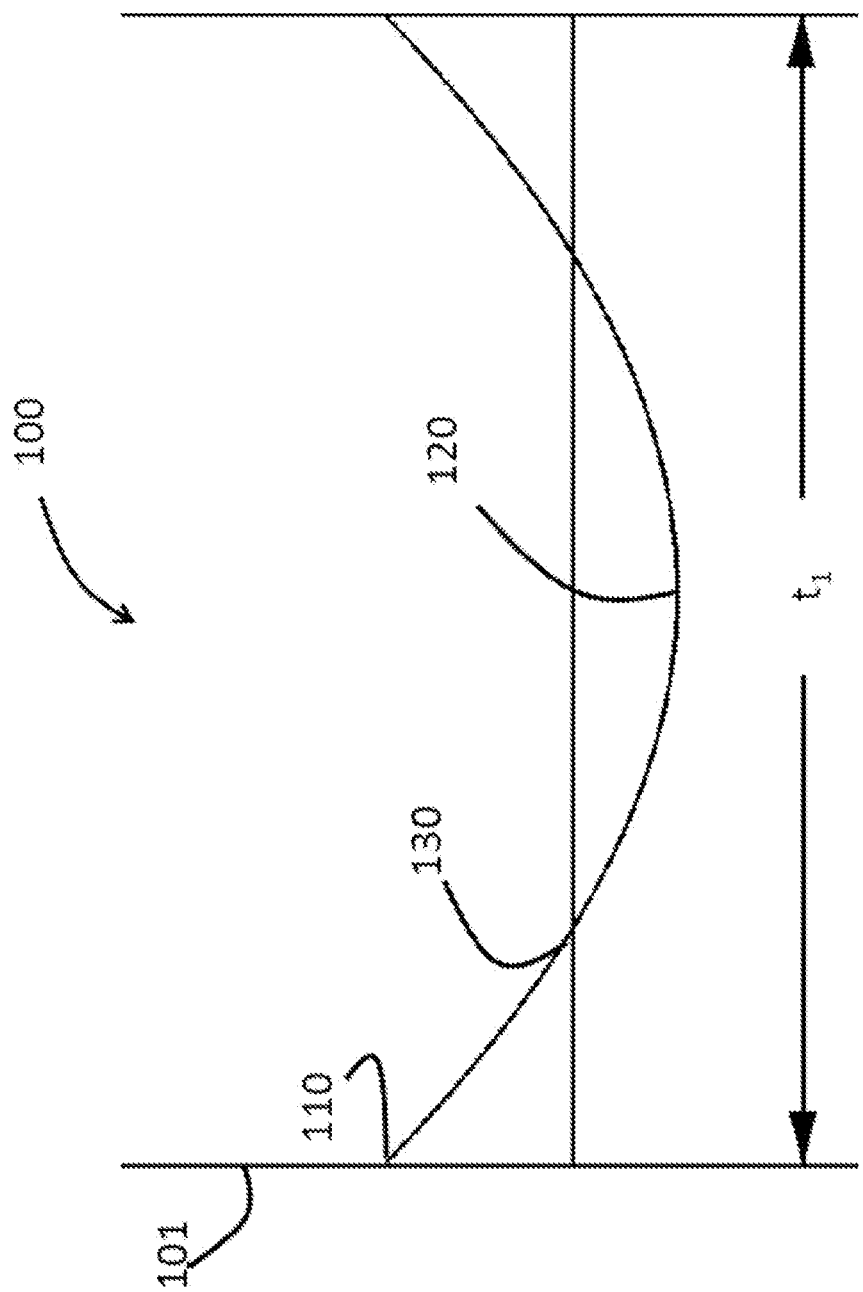
FIG. 1 is a cross-sectional view of a stress profile across a thickness of a known, thermally tempered glass-based article.

Reference will now be made in detail to various embodiments, examples of which are illustrated in the accompanying examples and drawings.

In the following description, like reference characters designate like or corresponding parts throughout the several views shown in the figures. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Directional terms as used herein—for example up, down, right, left, front, back, top, bottom, inward, outward—are made only with reference to the figures as drawn and are not intended to imply absolute orientation.

As used herein the term "glass-based" is meant to include any material made at least partially of glass, including glass, glass-ceramics, and sapphire. "Glass-ceramics" include materials produced through controlled crystallization of glass. In embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, $ZnO$—$Al_2O_3$-$nSiO_2$ (i.e. ZAS system), and/or glass-ceramics that include a predominant crystal phase including β-quartz solid solution, β-spodumene, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur. Unless otherwise specified, all compositions are expressed in terms of mole percent (mol %).

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Unless otherwise specified, all temperatures are expressed in terms of degrees Celsius (° C.).

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "chemical depth," "chemical depth of layer" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA) or Glow Discharge-Optical Emission Spectroscopy (GD-OES)). In particular, to assess the depth of $Na_2O$ diffusion or Na+ ion concentration may be determined using EPMA and a surface stress meter (described in more detail below).

Compression is expressed as a negative (<0) stress and tension is expressed as a positive (>0) stress, unless otherwise noted. Throughout this description, however, and unless otherwise, noted, CS is expressed as a positive or absolute value—i.e., as recited herein, CS=|CS|.

Described herein are thin, chemically strengthened glass-based articles that include glasses, such as silicate glasses including alkali-containing glass, and glass-ceramics that may be used as a cover glass for mobile electronic devices and touch-enabled displays. The glass-based articles may also be used in displays (or as display articles) (e.g., billboards, point of sale systems, computers, navigation systems, watches, phones, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that would benefit from some fracture resistance.

In particular, the glass-based articles described herein are thin and exhibit stress profiles that are typically achievable through thermally tempering thick glass-based substrates (i.e., having a thickness of about 3 mm or greater). The glass-based articles exhibit unique stress profiles along the thickness thereof. In some cases, the glass-based articles described herein exhibit a greater surface CS than tempered glass-based articles. In one or more embodiments, the glass-based articles have a compressive stress layer that extends deeper into the glass-based article (in which the CS decreases and increases more gradually) than known chemically strengthened glass-based articles, such glass-based article exhibits substantially improved fracture resistance, even when the glass-based article or a device including the same is dropped on a hard surface (e.g., granite) or a hard and rough surface (e.g., asphalt). The glass-based articles of one or more embodiments exhibit a greater maximum central tension (CT) value than some known chemically strengthened glass-based articles. Furthermore, according to one or more embodiments, glass-based articles, including glass-based substrates and glass-based substrates used as cover glass for mobile electronic devices, exhibit stable crack growth compared to existing glasses.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

Refracted near-field (RNF) method or scattered light polariscope (SCALP) may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Maximum CT values are measured using a SCALP. As used herein, depth of compression (DOC) means the depth at which the stress in the chemically strengthened alkali aluminosilicate glass article described herein changes from compressive to tensile. DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

As stated above, the glass-based articles described herein are chemically strengthened by ion exchange and exhibit stress profiles that are distinguished from those exhibited by known strengthened glass-based articles. In this disclosure, glass-based substrates are generally unstrengthened and strengthened glass-based articles generally refer to glass-based substrates that have been strengthened (by, for example, ion exchange). In this process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$.

Ion exchange processes are typically carried out by immersing a glass-based substrate in a molten salt bath (or two or more molten salt baths) containing the larger ions to be exchanged with the smaller ions in the glass-based substrate. It should be noted that aqueous salt baths may also be utilized. In addition, the composition of the bath(s) according to one or more embodiments includes more than one type of larger ion (e.g., Na+ and K+). It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOC and CS of the glass-based article that results from strengthening. By way of example, ion exchange of glass-based substrates may be achieved by immersion of the glass-based substrates in at least one molten bath containing a salt such as, but not limited to, nitrates, sulfates, and chlorides of the larger alkali metal ion. Typical nitrates include $KNO_3$, $NaNO_3$, $LiNO_3$, and combinations thereof. The temperature of the molten salt bath typically is in a range from about 350° C. up to about 480° C., while immersion times range from about 15 minutes up to about 100 hours depending on glass thickness, bath temperature and glass (or monovalent ion) diffusivity. However, temperatures and immersion times different from those described above may also be used.

In one or more embodiments, the glass-based substrates may be immersed in a molten salt bath of 100% $NaNO_3$ or 100% $KNO_3$ having a temperature from about 350° C. to about 480° C. for times ranging from about 15 minutes up to about 100 hours depending on glass thickness, bath temperature and glass (or monovalent ion) diffusivity. In the molten baths described in this disclosure, all percentages are percent by weight. In some embodiments, the glass-based substrate may be immersed in a molten mixed salt bath having a temperature from about 350° C. to about 480° C. and including from about 5% to about 90% $KNO_3$ and from about 10% to about 95% $NaNO_3$ for times ranging from about 15 minutes up to about 100 hours depending on glass thickness, bath temperature and glass (or monovalent ion) diffusivity.

Ion exchange conditions can be tailored to provide a hump region in the glass-based article. This hump region can be achieved by single bath or multiple baths, with the bath(s) having a single composition or mixed composition, due to the unique properties of the glass compositions used in the glass-based articles described herein.

Figure 3:
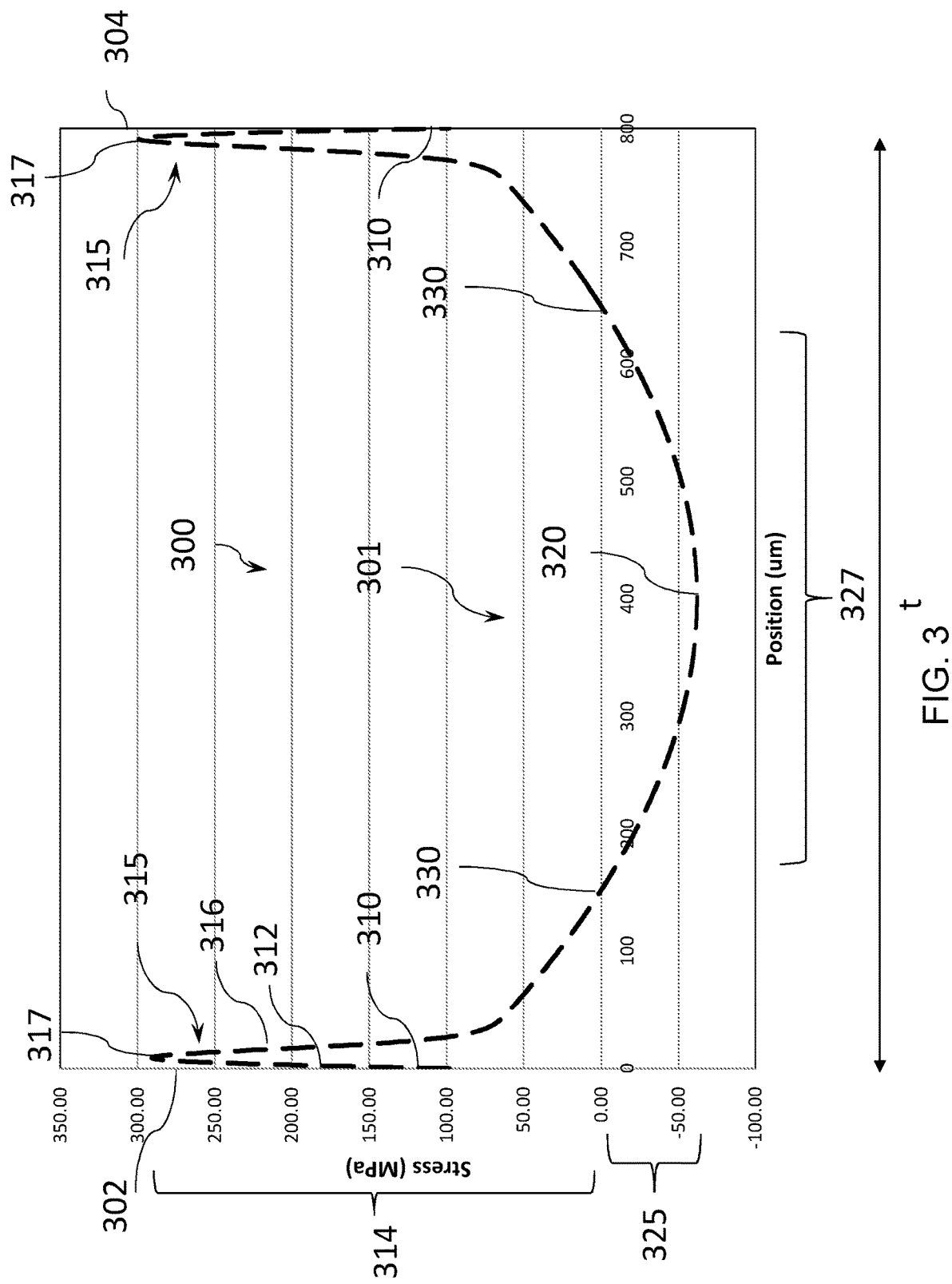
FIG. 3 is a cross-sectional view of stress profile across a thickness of a chemically strengthened glass-based article according to one or more embodiments of this disclosure.

As illustrated by FIG. 3, a glass-based article 300 according to one or more embodiments includes a first surface 302 and a second surface 304 opposing the first surface, defining a thickness t. In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter). FIG. 3 shows some embodiments in which the thickness t is 0.8 millimeter.

In FIG. 3, the glass-based article 300 includes a stress profile 301 that extends from the first surface 302 to the second surface 304 (or along the entire dimension of the thickness t) with a center between the first surface and the second surface (at 0.5t, and generally corresponding to the point of maximum CT 320). In FIG. 3, tensile stress is shown as negative, and compressive stress is shown as positive In the embodiments shown in FIG. 3, the stress profile 301 as measured by SCALP or RNF as described herein is illustrated. The y-axis represents the stress value and the x-axis represents the thickness or depth within the glass-based article. Furthermore, the stress profile 301 includes a surface stress 310, a hump stress region 315, an apex 317, a decreasing stress region 316, a DOC 330 at which the stress profile 301 turns from compressive to tensile, a tensile stress region 325, and a maximum tensile stress 320. In the embodiments shown, the surface stress 310 is a surface CS. In one or more embodiments, the surface stress 310 can be a tensile stress. As shown in FIG. 3, the CS at the surface 302 is about 100 MPa. In one or more embodiments, there may be a tensile stress at the first surface 302 and having a value from −200 MPa to less than 0 MPa. In the embodiments shown in FIG. 3, however, there is compressive stress at the first surface from greater than 0 MPa to 500 MPa, or greater than 0 MPa to 750 MPa. The CT layer 325 also has an associated depth or length 327 (along the thickness) defining the CT region or layer. For simplicity, one side (left, as shown in FIG. 3) will be explained in detail with the understanding that the other side (right, as shown in FIG. 3) may be the same, similar, or different from that explained. The CT layer 325 for one half of the figure corresponds to the distance between the DOC 330 and the maximum CT 320, whereas for the whole stress profile (as shown in this figure) the CT layer 325 includes the entire distance 327 from DOC 330 on one side to the DOC 330 on the other side. The DOC may be in a range from 0.1·t to 0.25·t. The glass-based article has a thickness from 0.01 mm to 3 mm.

The hump stress region 315 extends from the first surface 302 (or a point below the first surface 302) to the apex 317. In some embodiments, the apex 317 in a range of 0.001·t and 0.1·t. In specific embodiments, the apex is from 0.003·t to 0.03·t. As used herein "apex" refers to the top or highest part of the hump stress region, and may be a local maximum (in some embodiments it may be higher than the surface CS and thus be an overall maximum CS, and in other embodiments, it may be lower than the surface CS and not be an overall maximum). As shown in FIG. 3, in one or more embodiments, the compressive stress in the hump stress region 315 increases from the first surface 302 (or a point below the first surface 302) to the apex 317. Likewise, with respect to the second surface 304, a second hump stress region 315 extends from the second surface 304 (or a point below the second surface 304) to an apex 317 in a range of 0.999·t and 0.9·t. In specific embodiments, the apex is from 0.997·t to 0.97·t. The apex 317 has a CS from 25 MPa to 500 MPa (or 25 MPa to 500 MPa). In one or more embodiments, the CS at the apex will be higher than the surface stress. In specific embodiments, the CS at the apex 317 is from 100 MPa to 300 MPa. In specific embodiments, the apex 317 has a compressive stress from 25 MPa to 750 MPa, or 25 MPa to 700 MPa, or 25 MPa to 650 MPa, or 25 MPa to 600 MPa, or 25 MPa to 550 MPa, or 25 MPa to 575 MPa, 25 MPa to 450 MPa, 25 MPa and 400 MPa, 25 MPa and 350 MPa, 25 MPa and 300 MPa, 25 MPa and 250 MPa, 25 MPa and 200 MPa, 25 MPA and 150 MPa, 25 MPa and 100 MPa, 25 MPa and 50 MPa, 50 MPa and 450 MPa, 50 MPa and 400 MPa, 50 MPa and 350 MPa, 50 MPa and 300 MPa, 50 MPa and 250 MPa, 50 MPa and 200 MPa, 50 MPA and 150 MPa, 50 MPa and 100 MPa, 100 MPa and 450 MPa, 100 MPa and 400 MPa, 100 MPa and 350 MPa, 100 MPa and 300 MPa, 100 MPa and 250 MPa, 100 MPa and 200 MPa, 100 MPA and 150 MPa, 150 MPa and 750 MPa, 150 MPa and 700 MPa, 150 MPa and 650 MPa, 150 MPa and 600 MPa, 150 MPa and 550 MPa, 150 MPa and 500 MPa, 150 MPa and 450 MPa, 150 MPa and 400 MPa, 150 MPa and 350 MPa, 150 MPa and 300 MPa, 150 MPa and 250 MPa, 150 MPa and 200 MPa, 200 MPa and 750 MPa, 200 MPa and 700 MPa, 200 MPa and 650 MPa, 600 MPa and 550 MPa, 200 MPa and 500 MPa, 200 MPa and 450 MPa, 200 MPa and 400 MPa, 200 MPa and 350 MPa, 200 MPa and 300 MPa, or 200 MPa and 250 MPa.

In some embodiments all points of the hump stress region 315 comprise a tangent having a slope with a value from 25 MPa/micrometer to 500 MPa/micrometer. In some embodiments at least one point of the hump stress region 315 comprises a tangent having a slope with a value from 25 MPa/micrometer to 500 MPa/micrometer. As used herein, when a stress profile is described as having a "tangent having a slope with a value", it should be understood, that a mathematical formula, or curve representative of the stress profile includes such a tangent at one or more points along the curve. In other embodiments, the hump stress region 315 is free, or substantially free, of flat segments.

In some embodiments, the hump stress region 315 includes an increasing stress region 312 that extends between the first surface 302 and the apex 317. In some embodiments, at least one point of the stress profile in the increasing stress region 312 comprise a tangent having a slope with a value from 20 MPa/micrometer to 200 MPa/micrometer. In some embodiments, all points of the increasing stress region 312 comprise a tangent having a slope with a value from 20 MPa/micrometer to 200 MPa/micrometer. In other embodiments, the increasing stress region 312 is fee of flat segments. In one or more embodiments, the hump stress region 315 is buried beneath the first surface 302, that is, the hump stress region 315 extends from a position beneath the first surface 302 along the thickness direction of the substrate, and extends toward the center of the thickness. In some embodiments, the second hump region is similarly buried beneath the second surface 304.

The decreasing stress region 316 extends between the apex 317 and the DOC. In some embodiments, all points of the decreasing stress region 316 comprise a tangent having a slope with a value from −20 MPa/micrometer to −200 MPa/micrometer. In some embodiments, at least one point of the decreasing stress region 316 comprises a tangent having a slope with a value from −20 MPa/micrometer to −200 MPa/micrometer. In other embodiments, the decreasing stress region 316 is free, or substantially free, of flat segments.

In one or more embodiments, all points of the stress profile between the apex 317 and the center (at the point of maximum CT 320) are in the form a power-law profile having a power exponent, wherein the power exponent is from about 1.2 to 3.4. In some embodiments, all points of the stress profile between the apex 317 and the center form a power-law function in which the power exponent is from about 1.3 to about 2.8. As used herein, "power-law function" refers to a curve in which the stress is exponentially proportional to the depth or thickness.

The stress profile shown in FIG. 3 can be achieved by a two-step ion exchange process. The stress profiles described herein and exemplified in FIG. 3 provide significantly high stress at deep regions of the profile beneath the first surface 302 and second surface 304. In one or more embodiments, such stress profiles can be enhanced by the diffusion of multiple ions inside the glass. Glass-based substrates that contain $LiO_2$ enable potassium (K), sodium (Na) and lithium (Li) to be exchanged simultaneously (for example by sodium in a salt bath to be exchanged into the glass-based substrate for lithium in the glass-based substrate, and simultaneously for potassium in a salt bath to be exchanged into the glass-based substrate for sodium—either in the glass-based substrate originally or that had been exchanged into the glass-based substrate for lithium in the glass-based substrate) and the production of unique stress profiles that would be difficult to obtain in reasonable ion exchange times achieved by a single potassium ion exchange in a sodium glass-based substrate. According to one or more embodiments, ion exchange of three ions simultaneously provides for the manufacture of ion-exchanged glass-based articles with unique stress profiles.

In one or more embodiments, it is possible to create higher compressive stress at depth compared with prior ion-exchanged glass-based articles. Thus, it is possible to provide glass-based articles having a stress profile in which the stress is lower at the surface of the glass-based substrate than at the interior, where a hump stress region can have an apex with higher stress than at the surface. Alternatively, the stress can be higher at the surface than at the apex of the hump stress region, and in some embodiments, this can be achieved with an additional ion exchange step. In one or more embodiments, a scratch resistant film/coating can be deposited on one or both of the first surface or the second surface of the glass-based article. In embodiments that include such a scratch-resistant coating, a high stress at the surface of the glass-based substrate is not necessary to avoid scratches. In one or more embodiments, the hump stress region at a depth beneath the first surface can be used to provide improved drop performance or other desired attributes. According to one or more embodiments, the unique stress profiles provided herein can provide improved scratch behavior compared to existing glass-based articles.

Figure 4:
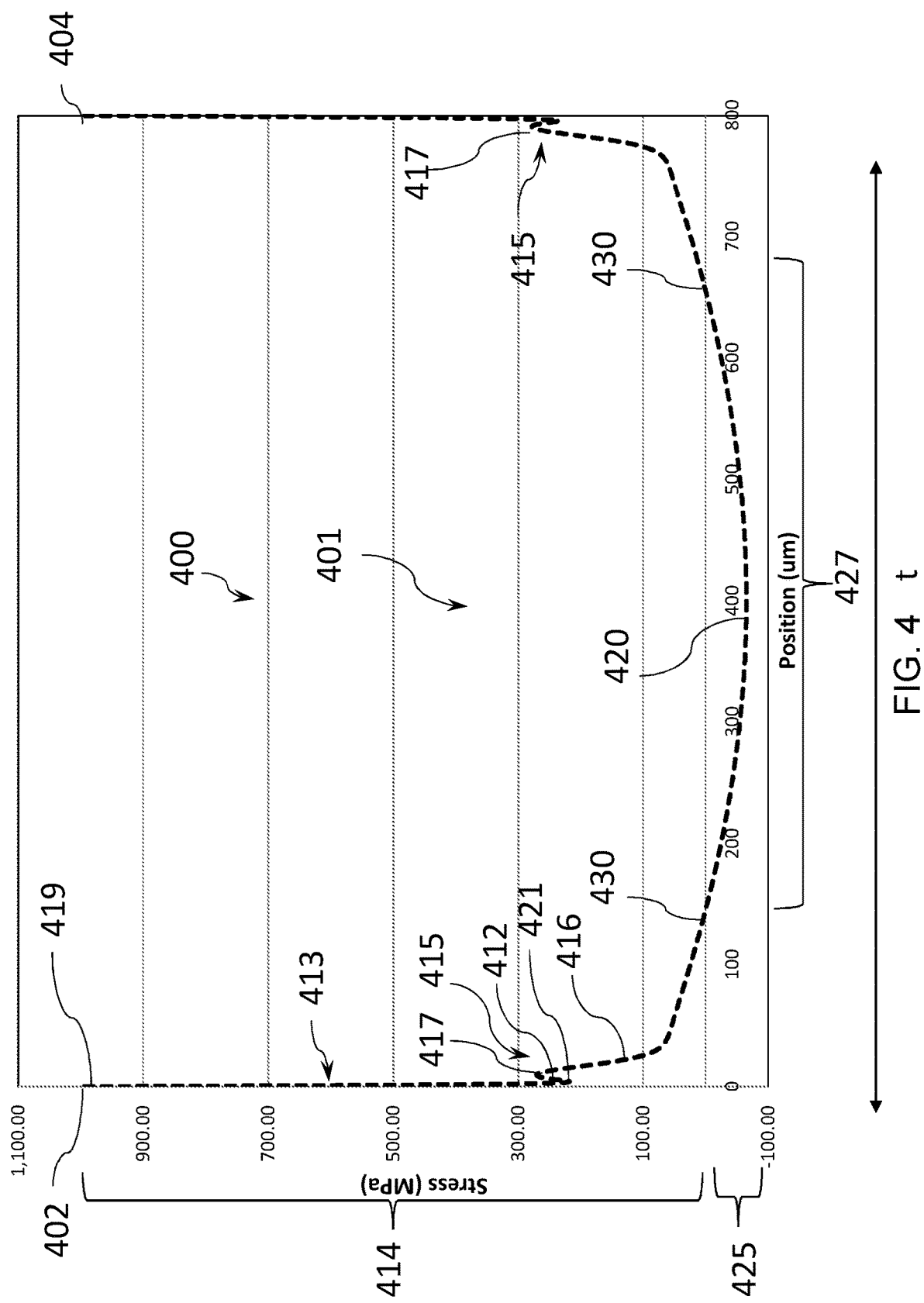
FIG. 4 is a cross-sectional view of stress profile across a thickness of a chemically strengthened glass-based article according to Example 1 and according to one or more embodiments of this disclosure.

Referring now to FIG. 4, some embodiments of a glass based substrate 400 having a stress profile 401 with regions similar to the stress profile shown in FIG. 3 is shown. However, in the stress profile of the glass-based substrate shown in FIG. 4, there is a relatively high surface stress region at the surface. The glass-based article 400 according to one or more embodiments includes a first surface 402 and a second surface 404 opposing the first surface, defining a thickness t with a center between the first surface and the second surface (at 0.5t, and generally corresponding to the point of maximum CT 420).

In FIG. 4, the glass-based article 400 includes a stress profile 401 that extends from the first surface 402 to the second surface 404 (or along the entire dimension of the thickness t). In FIG. 4 illustrates a stress profile 401 as measured by SCALP or RNF as described herein. The y-axis represents the stress value and the x-axis represents the thickness or depth within the glass-based article. In this example, the thickness (t) is 800 micrometers (microns, μm)

As illustrated in FIG. 4, the stress profile 401 includes a CS layer 414 and a CT region 425 (with a maximum CT 420), and a DOC 430 at which the stress profile 401 turns from compressive to tensile. The CS layer 414 includes a surface stress region 413 (or spike region), a transition 421, a hump stress region 415, an apex 417, and a decreasing stress region 416. The CT layer 425 has an associated depth or length 427 (along the thickness) defining the CT region or layer. For simplicity, one side (left, as shown in FIG. 4) will be explained in detail with the understanding that the other side (right, as shown in FIG. 4) may be the same, similar, or different from that explained. The CT layer 425 for one half of the figure corresponds to the distance between the DOC 430 and the maximum CT 420, whereas for the whole stress profile (as shown in this figure) the CT layer 425 includes the entire distance 427 from DOC 430 on one side to the DOC 430 on the other side.

The stress at the first surface 402 can be from 0 to 1500 MPa. In one or more embodiments, the surface stress at the first surface 402 is from about 150 MPa to 1500 MPa, or from about 200 MPa to about 1500 MPa, or from about 300 MPa to about 1500, or from about 400 MPa to about 1500, or from about 500 MPa to about 1500 MPa, or from about 600 MPa to about 1500 MPA. The maximum surface stress for any of the preceding ranges may be 800 MPa, 900 MPa, 1000 MPa, 1100 MPa, or 1200 MPa. In one or more embodiments, the compressive stress at the first surface is from 650 MPa to 1100 MPa. In FIG. 4, the CS at the surface 402 is about 1000 MPa.

The surface stress region 413 extends between the first surface 402 and the transition 421. The surface stress region 413 has a compressive stress that decreases in magnitude moving from the first surface 402 at a surface stress region maximum 419 to a surface stress region minimum that provides a transition 421. In some embodiments, all points of the surface stress region 413 comprise a tangent having a slope with a value from −25 MPa/micrometer to −200 MPa/micrometer. In specific embodiments, all points of the surface stress region 413 comprise a tangent having a slope with a value from −30 MPa/micrometer to −170 MPa/micrometer, and in more specific embodiments from −35 MPa/micrometer to −140 MPa/micrometer. In some embodiments, at least one point of the stress profile in the surface stress region 413 comprises a tangent having a slope with a value from −25 MPa/micrometer to −200 MPa/micrometer. In specific embodiments, at least one point of the stress profile in the surface stress region 413 comprises a tangent having a slope with a value from −30 MPa/micrometer to −170 MPa/micrometer, and in more specific embodiments from −35 MPa/micrometer to −140 MPa/micrometer. In some embodiments, the surface stress region 413 is free, or substantially free, of flat segments. The surface stress region 413 may also be referred to as a spike region.

The hump stress region 415 includes an increasing stress region 412. The increasing stress region 412 extends between the transition 421 and the apex 417 such that all points, or at least one point, of the increasing stress region 412 comprise a tangent having a slope with a value from 20 MPa/micrometer to 200 MPa/micrometer. In one or more embodiments, the hump stress region 415 is buried beneath the first surface 402. In some embodiments, a second hump region 415 is similarly buried beneath the second surface 404. In some embodiments, all points of the increasing stress region 412 comprise a tangent having a slope with a value from 20 MPa/micrometer to 200 MPa/micrometer. In some embodiments, at least one point of the stress profile in the increasing stress region 412 comprises a tangent having a slope with a value from 20 MPa/micrometer to 200 MPa/micrometer. In some embodiments, the increasing stress region 412 does not include any flat segments.

Apex 417 may be in a range of 0.001·t and 0.1·t. In specific embodiments, the apex 417 is from 0.003·t to 0.03·t. Likewise, with respect to the second surface 404, in some embodiments, a second hump stress region 415 extends from a point at the second surface 404 (or a point below the second surface 404) to an apex 417 in a range of 0.999·t and 0.9·t. In specific embodiments, the apex is from 0.997·t and 0.97·t. The apex 417 has a CS at the apex that is from 25 MPa to 500 MPa (or from 25 MPa to 750 MPa). In one or more embodiments, the CS at the apex will be lower than the surface stress. In specific embodiments, the CS at the apex 417 is from 100 MPa to 300 MPa. In specific embodiments, the apex 417 has a CS in a range of 25 MPa and 750 MPa, 25 MPa and 700 MPa, 25 MPa and 650 MPa, 25 MPa and 600 MPa, 25 MPa and 550 MPa, 25 MPa and 500 MPa, 25 MPa and 450 MPa, 25 MPa and 400 MPa, 25 MPa and 350 MPa, 25 MPa and 300 MPa, 25 MPa and 250 MPa, 25 MPa and 200 MPa, 25 MPA and 150 MPa, 25 MPa and 100 MPa, 25 MPa and 50 MPa, 50 MPa and 450 MPa, 50 MPa and 400 MPa, 50 MPa and 350 MPa, 50 MPa and 300 MPa, 50 MPa and 250 MPa, 50 MPa and 200 MPa, 50 MPA and 150 MPa, 50 MPa and 100 MPa, 100 MPa and 450 MPa, 100 MPa and 400 MPa, 100 MPa and 350 MPa, 100 MPa and 300 MPa, 100 MPa and 250 MPa, 100 MPa and 200 MPa, 100 MPA and 150 MPa, 150 MPa and 750 MPa, 150 MPa and 700 MPa, 150 MPa and 650 MPa, 150 MPa and 600 MPa, 150 MPa and 550 MPa, 150 MPa and 500 MPa, 150 MPa and 450 MPa, 150 MPa and 400 MPa, 150 MPa and 350 MPa, 150 MPa and 300 MPa, 150 MPa and 250 MPa, 150 MPa and 200 MPa, 200 MPa and 750 MPa, 200 MPa and 700 MPa, 200 MPa and 650 MPa, 200 MPa and 600 MPa, 200 MPa and 550 MPa, 200 MPa and 500 MPa, 200 MPa and 450 MPa, 200 MPa and 400 MPa, 200 MPa and 350 MPa, 200 MPa and 300 MPa, or 200 MPa and 250 MPa.

As shown in FIG. 4, the surface stress region 413 and the hump stress region 415 allows for the stress profile to decrease from the surface toward the center before increasing to the apex 417.

The decreasing stress region 416 extends between the apex 417 and the DOC 430. In some embodiments, all points of the decreasing stress region 416 comprise a tangent having a slope with a value from −20 MPa/micrometer to −200 MPa/micrometer. In some embodiments, at least one point of the stress profile in the decreasing stress region 416 comprises a tangent having a slope with a value from −20 MPa/micrometer to −200 MPa/micrometer. In some embodiments, the decreasing stress region 416 is free, or substantially free, of flat segments. The DOC is from 0.1·t to 0.25·t, and the tensile stress region 425 extends from the DOC 430 to the maximum tensile stress 420.

In one or more embodiments, all points of the stress profile between the apex 417 and the center are in the form a power-law function having a power exponent, wherein the power exponent is from about 1.2 to about 3.4. In some embodiments, all points of the stress profile between the apex 417 and the center form a power-law function having a power exponent is from about 1.3 to about 2.8. As used herein, "power-law function" refers to a curve in which the stress is exponentially proportional to the depth or thickness.

In one or more embodiments, $Li_2O$ is present in the glass-based article and/or glass-based substrate in a range of 0.1 mol % and 20 mol %, and in more specific embodiments, from 0.1 mol % to 10 mol %. In one or more embodiments, $P_2O_5$ is present in the glass-based article and/or glass-based substrate in a range of 0.1 mol % and 10 mol %. In one or more embodiments, the glass-based article and/or glass-based substrate is free of $K_2O$.

According to one or more embodiments, the glass-based article having the profile 401 shown in FIG. 4 is made using a three-step ion exchange process.

The glass-based articles described herein may be made by a two-step ion exchange process or a three-step ion exchange process, and exhibit improved crack growth stability compared to a glass-based article made by single step ion exchange process. The glass based articles described herein may further include a coating on one or both the first surface and the second surface, for example, a scratch resistant coating.

In one or more embodiments, the glass-based article includes a stress profile that is free, or substantially free, of any flat segments that extend in a depth direction or along at least a portion of the thickness t of the glass-based article. In other words, the stress profile is substantially continuously increasing or decreasing along the thickness t. In some embodiments, the stress profile is free, or substantially free, of any flat segments in a depth direction having a length of about 10 micrometers or more, about 50 micrometers or more, or about 100 micrometers or more, or about 200 micrometers or more. As used herein, the term "flat" refers to a slope having a magnitude of less than about 5 MPa/micrometer, or less than about 2 MPa/micrometer, or less than about 1 MPa/micrometer, or less than 0.5 MPa/micrometer, or less than 0.3 MPa/micrometer, or less than 0.2 MPa/micrometer, or less than 0.1 MPa/micrometer, down to and including zero slope, along the segment. In some embodiments, one or more portions of the stress profile that are free, or substantially free, of any flat segments in a depth direction are present at depths within the glass-based article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include flat segments, but from a depth of about 5 micrometers or greater from the first surface, the stress profile may be free, or substantially free, of flat segments.

In some embodiments, the stress profile may be modified by heat treatment. In such embodiments, the heat treatment may occur before any ion-exchange processes, between ion-exchange processes, or after all ion-exchange processes. In some embodiments, the heat treatment may reduce the slope of the stress profile at or near the surface. In some embodiments, where a steeper or greater slope is desired at the surface, an ion-exchange process after the heat treatment may be utilized to provide a "spike" or to increase the slope of the stress profile at or near the surface.

In one or more embodiments, the stress profile is generated due to a non-zero concentration of a metal oxide(s) that varies along a portion of the thickness. As mentioned above, the variation in metal oxide concentration may be referred to herein as a metal oxide concentration gradient.

The concentration of metal oxide may include more than one metal oxide (e.g., a combination of $Na_2O$ and $K_2O$. In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na- and K-containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, due to the size of the monovalent ions that are exchanged into the glass for smaller monovalent ions. In such glass-based articles, the area at or near the surface comprises a greater CS due to the greater amount of larger ions (e.g., K+ ions) at or near the surface. This greater CS may be exhibited by a stress profile having a steeper slope at or near the surface (e.g., a spike in the stress profile at the surface).

The concentration gradient or variation of one or more metal oxides is created by chemically strengthening a glass-based substrate, as previously described herein, in which a plurality of first metal ions in the glass-based substrate is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion. The second metal ion is present in the glass-based substrate as an oxide thereof (e.g., $Na_2O$, $K_2O$, $Rb_2O$, $Cs_2O$, or a combination thereof).

In one or more embodiments, the metal oxide concentration gradient extends through a substantial portion of the thickness t or the entire thickness t of the glass-based article, including the CT layer. In one or more embodiments, the concentration of the metal oxide is about 0.5 mol % or greater in the CT layer. In some embodiments, the concentration of the metal oxide may be about 0.5 mol % or greater (e.g., about 1 mol % or greater) along the entire thickness of the glass-based article, and is greatest at the first surface and/or the second surface and decreases substantially constantly to a value at a point between the first surface and the second surface. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT layer. The total concentration of the particular metal oxide in the glass-based article may be in the range from about 1 mol % to about 20 mol %.

In one or more embodiments, the glass-based article includes a first metal oxide concentration and a second metal oxide concentration, such that the first metal oxide concentration is in the range from about 0 mol % to about 15 mol % along a first thickness range from about Otto about 0.5t, and the second metal oxide concentration is in the range from about 0 mol % to about 10 mol % from a second thickness range from about 0 micrometers to about 25 micrometers (or from about 0 micrometers to about 12 micrometers, or from about 2 microns to about 25 microns, or from about 2 microns to about 22 microns, or from about 2 microns to about 20 microns, or from about 2 microns to about 19 microns, or from about 2 microns to about 18 microns, or from about 2 microns to about 17 microns, or from about 2 microns to about 16 microns, or from about 2 microns to about 15 microns, or from about 2 microns to about 14 microns, or from about 2 microns to about 12 microns, or from about 4 microns to about 22 microns, or from about 5 microns to about 20 microns, or from about 5 microns to about 18 microns, or from about 5 microns to about 16 microns, or from about 5 microns to about 14 microns, or from about 5 microns to about 12 microns, or from about 7 microns to about 12 microns, or from about 7 microns to about 14 microns, or from about 7 microns to about 15 microns, or from about 7 microns to about 16 microns, or from about 7 microns to about 17 microns, or from about 7 microns to about 18 microns, or from about 7 microns to about 19 microns); however, the concentration of one or both the first metal oxide and the second metal oxide is non-zero along a substantial portion or the entire thickness of the glass-based article. The glass-based article may include an optional third metal oxide concentration. The first metal oxide may include $Na_2O$, while the second metal oxide may include $K_2O$. The concentration of the metal oxide may be determined from a baseline amount of the metal oxide in the glass-based substrate prior to being modified to include the concentration gradient of such metal oxide.

In some embodiments, the glass-based substrate comprises a high liquidus viscosity that enables the formation of the glass-based substrates via down-draw techniques (e.g., fusion draw, slot draw, and other like methods), which can provide high precision surface smoothness. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature). In general, the glasses used to make glass-based substrates (or articles) described herein have a liquidus viscosity of about 100 kilopoise (kP) or greater. In scenarios where a higher liquidus viscosity is desired for down-draw processability, the glasses used to make the glass-based substrates (or articles) exhibit a liquidus viscosity of about 200 kP or more (e.g., about 300 kP or greater, or about 400 kP or greater, or about 500 kP or greater, or 600 kP or greater). The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96(2012), titled "Standard Practice for Measuring Viscosity of Glass Above the Softening Point".

In some instances, the glass-based article exhibits improved drop Fracture performance when it includes a compressive stress profile according to the concepts described herein than if the same glass-based article does not include a compressive stress profile according to the concepts described herein. Fracture performance is evaluated with a Drop Test, as described here.

For the Drop Test, an abrasive surface of silicon carbide or alumina engineered sandpaper is used comprising either 30 grit, or 180 grit. In some versions of the Drop Test, sandpaper having 30 grit is used, as it has a surface topography that is more consistent than either concrete or asphalt, and a particle size and sharpness that produces the desired level of specimen surface damage. As used herein, the term "fracture" means that a crack propagates across the entire thickness and/or entire surface of a substrate when the substrate is dropped or impacted by an object.

To carry out the Drop Test, a glass-based article is retrofit to an i-Phone® 3G as the cover glass. The phone is then face-dropped (i.e., with the cover glass facing downward) onto an abrasive surface (specified as either 180 grit sandpaper, or 30 grit sandpaper) which is facing up. The sandpaper is supported on a standard aluminum test stage. The phone is first dropped from a height of 20 cm. If the glass-based article does not fracture, the phone is dropped again in a similar manner from 10 cm higher (or 30 cm) onto the same sandpaper. If the phone again survives the previous drop height, the height is incremented 10 cm, and so on until the maximum drop height is attained. The maximum drop height is either the stated test maximum, or glass-based article failure by fracture. If a sample fails a particular drop height, that drop height is denoted by a black dot and, accordingly, the sample survived a drop height that is 10 cm less than the height indicated by the black dot. If a sample passes the maximum drop height, such is indicated by a gray dot. Accordingly, for example, looking at FIG. 5, for Example 1, four samples passed the maximum drop height of 220 cm, and the average drop height survived was 192 cm for the 10 samples shown in that figure. A new piece of sandpaper is used for each sample, and that same piece of sandpaper is used for all drop heights for that sample.

Figure 5:
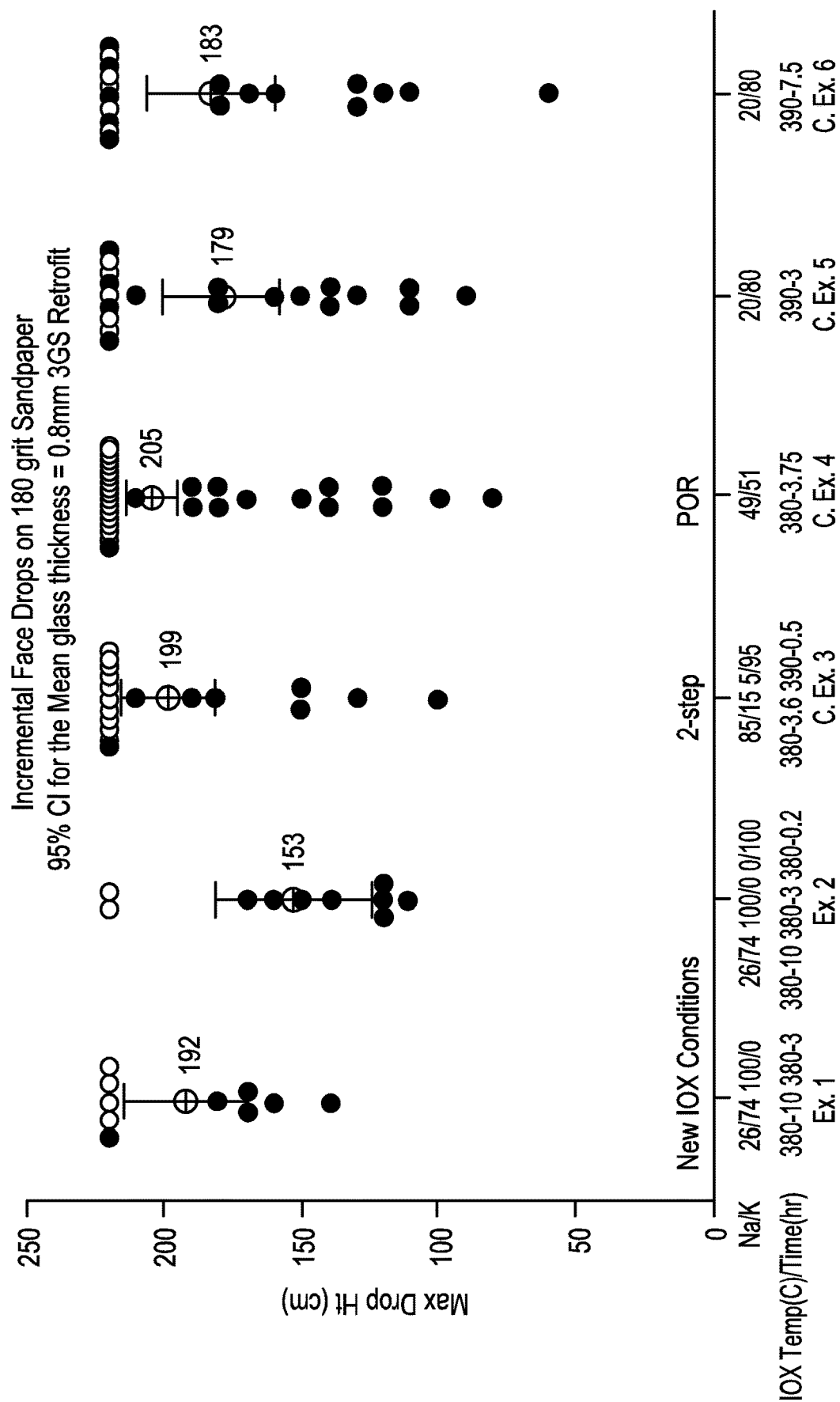
FIG. 5 is a graph showing results for incremental face drops on sandpaper tests for Comparative Examples 1 and 2 and Comparative Examples 4-6.
Figure 6:
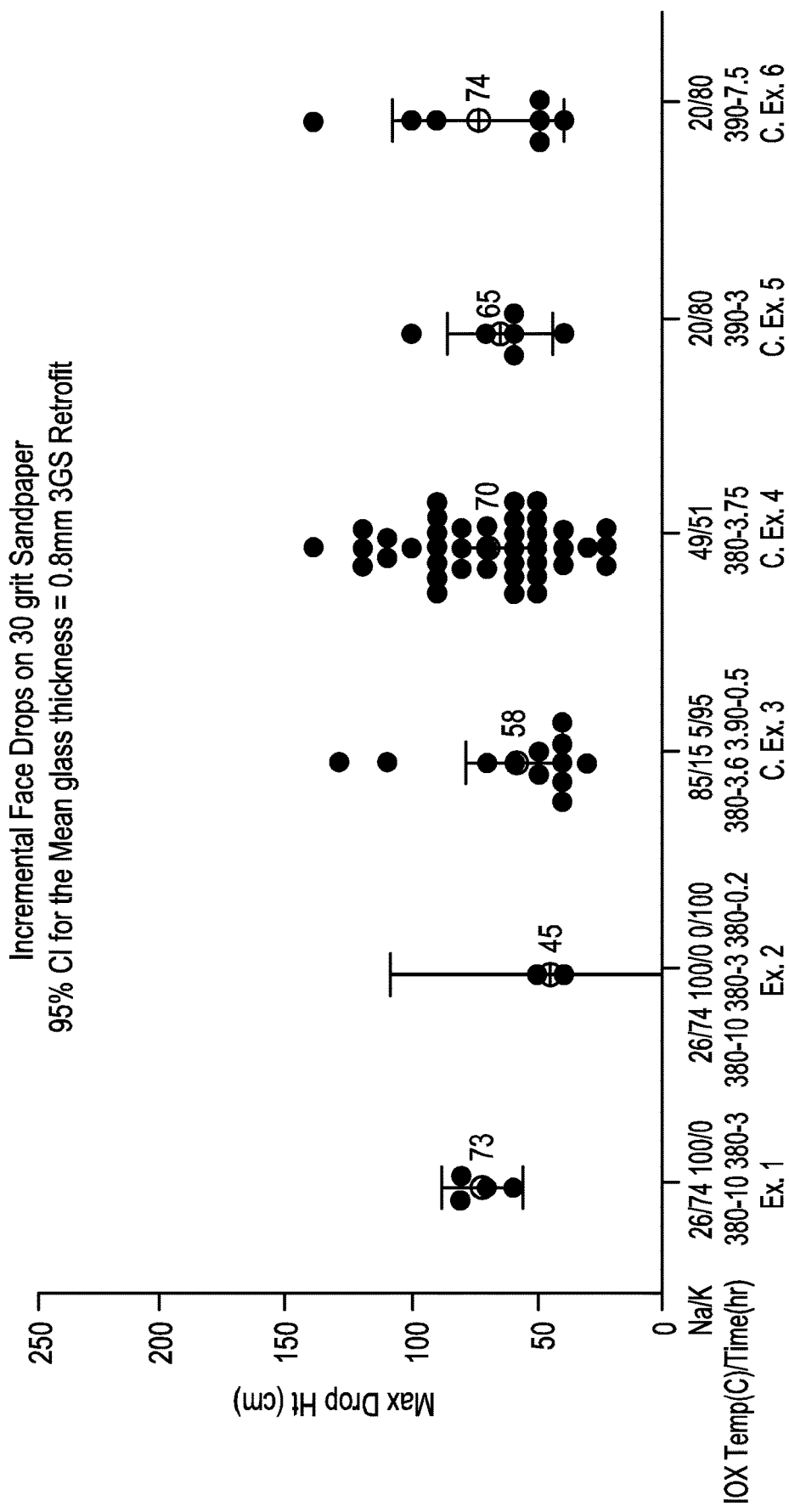
FIG. 6 is a graph showing results for incremental face drops on sandpaper tests for Comparative Examples 1 and 2 and Comparative Examples 4-6.

FIG. 5 shows the results of a Drop Test with various samples (Examples 1 and 2, as well as Comparative Examples 4-6), using 180 grit sandpaper, and a test maximum height of 220 cm. FIG. 6 shows the results of a Drop Test with various samples (Examples 1 and 2, as well as Comparative Examples 4-6), using 30 grit sandpaper, and a test maximum height of 220 cm, wherein each of the samples was one that previously survived the Drop Test of FIG. 5, i.e., they each had survived a 220 cm maximum drop height onto 180 grit sandpaper. In FIG. 6, although none of the samples survived the full 220 cm drop height, it can be said that for Example 1, for example, four out of four samples (or 100%) survived a maximum height of 50 cm or more.

To determine the survivability rate of the glass-based articles when dropped from a predetermined height using the Drop Test as described herein, at least five identical (or nearly identical) samples (i.e., having approximately the same composition and, if strengthened, approximately the same compressive stress and depth of compression/depth of layer) of the glass-based articles are tested, although larger numbers (e.g., 10, 20, 30, etc.) of samples may be subjected to testing to raise the confidence level of the test results. Each sample is dropped from progressively higher heights and, if no fracture occurs, until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

When subjected to the Drop Test described above, embodiments of the glass-based article described herein have about a 60% or more survival rate when dropped onto the specified grit sandpaper from a specified height. For example, a glass-based article is described as having a 60% survival rate when dropped from a given height when three of five identical (or nearly identical) samples (as described below) survive the Drop Test without fracture when dropped from the prescribed height (here 100 cm). In other embodiments, the survival rate in the 100 cm Drop Test (with 180 grit sandpaper) of the glass-based articles that are strengthened is about 70% or more, in other embodiments, about 80% or more, and, in still other embodiments, about 90% or more. In other embodiments, the survival rate of the strengthened glass-based articles dropped from a height of 50 cm in Drop Test (with 30 grit sandpaper) is about 60% or more, in other embodiments, about 70% or more, in still other embodiments, about 80% or more, and, in other embodiments, about 90% or more. In one or more embodiments, the survival rate of the strengthened glass-based articles dropped from a height of 225 cm in the Drop Test (with 180 grit sandpaper) is about 50% or more, in other embodiments, about 60% or more, in other embodiments, about 70% or more, in still other embodiments, about 80% or more, and, in other embodiments, about 90% or more. In some embodiments, the average drop height (with at least 10 samples tested) for the strengthened glass-based articles surviving the Drop Test (with 180 grit sandpaper) is about 150 cm or more, in some embodiments about 160 cm or more, in some embodiments about 170 cm or more, in some embodiments about 180 cm or more, in some embodiments about 190 cm or more. In some embodiments, the average drop height (with at least 2 samples tested) for the strengthened glass-based articles surviving the Drop Test (with 30 grit sandpaper) is about 40 cm or more, in some embodiments about 50 cm or more, in some embodiments about 60 cm or more, in some embodiments about 70 cm or more.

The glass-based articles described herein may be transparent. In one or more the glass-based article may have a thickness of about 1 millimeter or less and exhibit a transmittance of about 88% or greater over a wavelength in the range from about 380 nm to about 780 nm. In one or more embodiments, the glass-based articles exhibit a drop performance which averages greater than 100 cm when an 180 grit paper is used for a glass-based article of 0.8 mm is tested in the Drop Test.

Choice of substrates, in terms of cation diffusivity, is not particularly limited. In some examples, the glass-based article may be described as having a high cation diffusivity for ion exchange. In one or more embodiments, the glass or glass-ceramic has fast ion-exchange capability, e.g., where diffusivity is greater than 500 μm/hr or may be characterized as greater than 450 μm$^2$/hour at 460° C. In one or more embodiments, the glass or glass-ceramic exhibits a sodium ion diffusivity that is about 450 μm$^2$/hour or greater at 460° C. or is about 500 μm/hour or greater at 460° C. In one or more embodiments, the glass or glass-ceramic exhibits a potassium ion diffusivity that is about 450 μm$^2$/hour or greater at 460° C. or is about 500 μm/hour or greater at 460° C.

The glass-based article may include an amorphous substrate, a crystalline substrate or a combination thereof (e.g., a glass-ceramic substrate). In one or more embodiments, the glass-based substrate (prior to being chemically strengthened into a glass-based article, as described herein) may include a glass composition, in mole percent (mole %), including: $SiO_2$ in the range from about 40 to about 80, $Al_2O_3$ in the range from about 10 to about 30, $B_2O_3$ in the range from about 0 to about 10, $R_2O$ in the range from about 0 to about 20, and RO in the range from about 0 to about 15. As used herein, $R_2O$ refers to the total amount of alkali metal oxides such as $Li_2O$, $Na_2O$, $K_2O$, $Rb_2O$, and $Cs_2O$. As used herein RO refers to the total amount of alkaline earth metal oxides such as MgO, CaO, SrO, BaO, ZnO and the like. In some instances, the composition may include either one or both of $ZrO_2$ in the range from about 0 mol % to about 5 mol % and $P_2O_5$ in the range from about 0 to about 15 mol %. $TiO_2$ can be present from about 0 mol % to about 2 mol %.

In some embodiments, the glass composition may include $SiO_2$ in an amount, in mol %, in the range from about 45 to about 80, from about 45 to about 75, from about 45 to about 70, from about 45 to about 65, from about 45 to about 60, from about 45 to about 65, from about 45 to about 65, from about 50 to about 70, from about 55 to about 70, from about 60 to about 70, from about 60 to about 72, from about 68 to about 75, from about 70 to about 75, from about 70 to about 72, from about 50 to about 65, or from about 60 to about 65.

In some embodiments, the glass composition may include $Al_2O_3$ in an amount, in mol %, in the range from about 5 to about 28, from about 5 to about 26, from about 5 to about 25, from about 5 to about 24, from about 5 to about 22, from about 5 to about 20, from about 6 to about 30, from about 6 to about 10, from about 8 to about 30, from about 10 to about 30, from about 12 to about 30, from about 14 to about 30, 15 to about 30, from about 12 to about 18, from about 6 to about 28, from about 6 to about 26, from about 6 to about 25, from about 6 to about 24, from about 6 to about 22, from about 6 to about 20, from about 6 to about 19, from about 7 to about 18, from about 7 to about 17, from about 7 to about 16, from about 7 to about 15, from about 7 to about 28, from about 7 to about 26, from about 7 to about 25, from about 7 to about 24, from about 7 to about 22, from about 7 to about 20, from about 7 to about 19, from about 7 to about 18, from about 7 to about 17, from about 7 to about 16, from about 7 to about 15, from about 8 to about 28, from about 8 to about 26, from about 8 to about 25, from about 8 to about 24, from about 8 to about 22, from about 8 to about 20, from about 8 to about 19, from about 8 to about 18, from about 8 to about 17, from about 8 to about 16, from about 8 to about 15, from about 9 to about 28, from about 9 to about 26, from about 9 to about 25, from about 9 to about 24, from about 9 to about 22, from about 9 to about 20, from about 9 to about 19, from about 9 to about 18, from about 9 to about 17, from about 9 to about 16, from about 9 to about 15; from about 10 to about 28, from about 10 to about 26, from about 10 to about 25, from about 10 to about 24, from about 10 to about 22, from about 10 to about 20, from about 10 to about 19, from about 10 to about 18, from about 10 to about 17, from about 10 to about 16, from about 10 to about 15, from about 11 to about 28, from about 11 to about 26, from about 11 to about 25, from about 11 to about 24, from about 11 to about 22, from about 11 to about 20, from about 11 to about 19, from about 11 to about 18, from about 11 to about 17, from about 11 to about 16, from about 11 to about 15, from about 12 to about 28, from about 12 to about 26, from about 12 to about 25, from about 12 to about 24, from about 12 to about 22, from about 12 to about 20, from about 12 to about 19, from about 12 to about 18, from about 12 to about 17, from about 12 to about 16, from about 12 to about 15.

In one or more embodiments, the glass composition may include $B_2O_3$ in an amount, in mol %, in the range from about 0 to about 8, from about 0 to about 6, from about 0 to about 4, from about 0.1 to about 10, from about 0.1 to about 8, from about 0.1 to about 6, from about 0.1 to about 4, from about 0.5 to about 5, from about 1 to about 10, from about 2 to about 10, from about 4 to about 10, from about 2 to about 8, from about 0.1 to about 5, or from about 1 to about 3. In some instances, the glass composition may be free, or substantially free, of $B_2O_3$. As used herein, the phrases "substantially free" or "free" with respect to the components of the composition means that the component is not actively or intentionally added to the composition during initial batching, but may be present as an impurity in an amount less than about 0.001 mol %.

In some embodiments, the glass composition may include one or more alkaline earth metal oxides, such as MgO, CaO and ZnO. In some embodiments, the total amount of the one or more alkaline earth metal oxides may be a non-zero amount up to about 15 mol %. In one or more specific embodiments, the total amount of any of the alkaline earth metal oxides may be a non-zero amount up to about 14 mol %, up to about 12 mol %, up to about 10 mol %, up to about 8 mol %, up to about 6 mol %, up to about 4 mol %, up to about 2 mol %, or up about 1.5 mol %. In some embodiments, the total amount, in mol %, of the one or more alkaline earth metal oxides may be in the range from about 0.01 to 10, from about 0.01 to 8, from about 0.01 to 6, from about 0.01 to 5, from about 0.05 to 10, from about 0.05 to 2, or from about 0.05 to 1. The amount of MgO may be in the range from about 0 mol % to about 5 mol % (e.g., from about 0.001 to about 1, from about 0.01 to about 2, or from about 2 to about 4, from about 1 to about 4). The amount of CaO may be in the range from about 0 mol % to about 5 mol % (e.g., from about 0.001 to about 1, from about 0.01 to about 2, or from about 2 to about 4, from about 1 to about 4). The amount of ZnO may be in the range from about 0 to about 3 mol %, from about 0 to about 2 mol % (e.g., from about 1 mol % to about 2 mol %). The amount of CaO may be from about 0 mol % to about 2 mol % (e.g., from about 1 to about 2). In one or more embodiments, the glass composition may include MgO and may be free, or substantially free, of CaO and ZnO. In one variant, the glass composition may include any one of CaO or ZnO and may be free, or substantially free, of the others of MgO, CaO and ZnO. In one or more specific embodiments, the glass composition may include only two of the alkaline earth metal oxides of MgO, CaO and ZnO and may be free, or substantially free, of the third of the earth metal oxides. In some embodiments, the total amount of MgO+CaO+ZnO is, in mol %, from about 0.1 to about 14, from about 0.1 to about 12, from about 0.1 to about 10, from about 0.1 to about 9, from about 0.1 to about 8. from about 0.1 to about 7, from about 0.1 to about 6, from about 0.1 to about 5.

The total amount, in mol %, of alkali metal oxides $R_2O$ in the glass composition may be in the range from about 5 to about 20, from about 5 to about 18, from about 5 to about 16, from about 5 to about 15, from about 5 to about 14, from about 5 to about 12, from about 5 to about 10, from about 5 to about 8, from about 5 to about 20, from about 6 to about 20, from about 7 to about 20, from about 8 to about 20, from about 9 to about 20, from about 10 to about 20, from about 11 to about 20, from about 12 to about 18, or from about 14 to about 18. In some embodiments the total amount of $Li_2O+Na_2O+K_2O$ is, in mol %, from about 5 to about 15, from about 5 to about 14, from about 5 to about 12, from about 5 to about 10.

In one or more embodiments, the glass composition includes $Na_2O$ in an amount in the range from about 0 mol % to about 18 mol %, from about 0 mol % to about 16 mol % or from about 0 mol % to about 14 mol %, from about 0 mol % to about 12 mol %, from about 0 to about 10, from about 0 to about 8, from about 0 to about 6, from about 0.1 to about 6, from about 2 mol % to about 18 mol %, from about 4 mol % to about 18 mol %, from about 6 mol % to about 18 mol %, from about 8 mol % to about 18 mol %, from about 8 mol % to about 14 mol %, from about 8 mol % to about 12 mol %, or from about 10 mol % to about 12 mol %. In some embodiments, the composition may include about 4 or more mol % $Na_2O$.

In some embodiments, the amount of $Li_2O$ and $Na_2O$ is controlled to a specific amount or ratio to balance formability and ion exchangeability. For example, as the amount of $Li_2O$ increases, the liquidus viscosity may be reduced, thus preventing some forming methods from being used; however, such glass compositions are ion exchanged to deeper DOC levels, as described herein. The amount of $Na_2O$ can modify liquidus viscosity but can inhibit ion exchange to deeper DOC levels.

In one or more embodiments, the glass composition may include $K_2O$ in an amount less than about 5 mol %, less than about 4 mol %, less than about 3 mol %, less than about 2 mol %, or less than about 1 mol %. In one or more alternative embodiments, the glass composition may be free, or substantially free, of $K_2O$.

In one or more embodiments, the glass composition may include $Li_2O$ in an amount about 0 mol % to about 18 mol %, from about 0 mol % to about 15 mol % or from about 0 mol % to about 10 mol %, from about 0 mol % to about 8 mol %, from about 0 mol % to about 6 mol %, from about 0 mol % to about 4 mol % or from about 0 mol % to about 2 mol %, from about 2 to about 15, from about 2 to about 14, from about 2 to about 12, from about 2 to about 10, from about 2 to about 9. In some embodiments, the glass composition may include $Li_2O$ in an amount about 1 mol % to about 20 mol %, 2 mol % to about 10 mol %, from about 4 mol % to about 10 mol %, from about 5 mol % to about 15 mol %, from about 5 mol % to about 10 mol %, from about 6 mol % to about 10 mol, or from about 5 mol % to about 8 mol %.

In one or more embodiments, the glass composition may include $Fe_2O_3$. In such embodiments, $Fe_2O_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be free, or substantially free, of $Fe_2O_3$.

In one or more embodiments, the glass composition may include $ZrO_2$. In such embodiments, $ZrO_2$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween, including from about 0.1 to about 1, 0.1 to about 0.9, from about 0.1 to about 0.8 from about 0.1 to about 0.7, from about 0.1 to about 0.6, from about 0.1 to about 0.5. In one or more alternative embodiments, the glass composition may be free, or substantially free, of $ZrO_2$.

In one or more embodiments, the glass composition may include $P_2O_5$ in a range from about 0 mol % to about 10 mol %, from about 0 mol % to about 8 mol %, from about 0 mol % to about 6 mol %, from about 0 mol % to about 4 mol %, from about 0.1 mol % to about 10 mol %, from about 0.1 mol % to about 8 mol %, from about 2 mol % to about 8 mol %, from about 2 mol % to about 6 mol % or from about 2 mol % to about 4 mol %. In some instances, the glass composition may be free, or substantially free, of $P_2O_5$.

In one or more embodiments, the glass composition may include $TiO_2$. In such embodiments, $TiO_2$ may be present in an amount less than about 6 mol %, less than about 4 mol %, less than about 2 mol %, or less than about 1 mol %. In one or more alternative embodiments, the glass composition may be free, or substantially free, of $TiO_2$. In some embodiments, $TiO_2$ is present in an amount in the range from about 0.1 mol % to about 6 mol %, or from about 0.1 mol % to about 4 mol %.

In some embodiments, the glass composition may include various compositional relationships. For example, the glass composition may include a ratio of the amount of $Li_2O$ (in mol %) to the total amount of $R_2O$ (in mol %) in the range from about 0 to about 1, from about 0 to about 0.5, from about 0.5 to about 1, from about 0 to about 0.4, from about 0.4 to about 1, from about 0.1 to about 0.5, or from about 0.2 to about 0.4.

In some embodiments, the glass composition may include a difference between the total amount of $R_2O$ (in mol %) to the amount of $Al_2O_3$ (in mol %) ($R_2O$—$Al_2O_3$) in the range from about 0 to about 5 (e.g., from about 0 to about 4, from about 0 to about 3, from about 0.1 to about 4, from about 0.1 to about 3, from about 0.1 to about 2 or from about 1 to about 2). In some embodiments, the glass composition may include a different between the total amount of $R_2O$ (in mol %) to the amount of $Al_2O_3$ (in mol %) ($R_2O—Al_2O_3$) in the range from about −5 to about 0.

In some embodiments, the glass composition may include a difference between the total amount of $R_xO$ (in mol %) to the amount of $Al_2O_3$ (in mol %) ($R_xO—Al_2O_3$) in the range from about 0 to about 5 (e.g., from about 0 to about 4, from about 0 to about 3, from about 0.1 to about 4, from about 0.1 to about 3, from about 1 to about 3, or from about 2 to about 3). As used herein, RxO includes $R_2O$ and RO, as defined herein.

In some embodiments, the glass composition may include a ratio of the total amount of $R_2O$ (in mol %) to the amount of $Al_2O_3$ (in mol %) ($R_2O/Al_2O_3$) in the range from about 0 to about 5 (e.g., from about 0 to about 4, from about 0 to about 3, from about 1 to about 4, from about 1 to about 3, or from about 1 to about 2).

In one or more embodiments, the glass composition includes a combined amount of $Al_2O_3$ and $Na_2O$ greater than about 15 mol % (e.g., greater than about 18 mol %, greater than about 20 mol %, or greater than about 23 mol %). The combined amount of $Al_2O_3$ and $Na_2O$ may be up to and including about 30 mol %, about 32 mol % or about 35 mol %.

The glass composition of one or more embodiments may exhibit a ratio of the amount of MgO (in mol %) to the total amount of RO (in mol %) in the range from about 0 to about 2.

In some embodiments, glass composition may be free, or substantially free, of nucleating agents. Examples of typical nucleating agents are $TiO_2$, $ZrO_2$ and the like. Nucleating agents may be described in terms of function in that nucleating agents are constituents in the glass can initiate the formation of crystallites in the glass.

In some embodiments, the compositions used for the glass-based substrate may be batched with from about 0 mol % to about 2 mol % of at least one fining agent selected from a group that includes $Na_2SO_4$, NaCl, NaF, NaBr, $K_2SO_4$, KCl, KF, KBr, and $SnO_2$. The glass composition according to one or more embodiments may further include $SnO_2$ in the range from about 0 to about 2, from about 0 to about 1, from about 0.1 to about 2, from about 0.1 to about 1, or from about 1 to about 2. The glass compositions disclosed herein may be free, or substantially free, of $As_2O_3$ and/or $Sb_2O_3$.

In one or more embodiments, the composition may specifically include from about 62 mol % to 75 mol % $SiO_2$; from about 10.5 mol % to about 17 mol % $Al_2O_3$; from about 5 mol % to about 13 mol % $Li_2O$; from about 0 mol % to about 4 mol % ZnO; from about 0 mol % to about 8 mol % MgO; from about 2 mol % to about 5 mol % $TiO_2$; from about 0 mol % to about 4 mol % $B_2O_3$; from about 0 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % MnOx; and from about 0.05 mol % to about 0.2 mol % $SnO_2$.

In one or more embodiments, the composition may include from about 67 mol % to about 74 mol % $SiO_2$; from about 11 mol % to about 15 mol % $Al_2O_3$; from about 5.5 mol % to about 9 mol % $Li_2O$; from about 0.5 mol % to about 2 mol % ZnO; from about 2 mol % to about 4.5 mol % MgO; from about 3 mol % to about 4.5 mol % $TiO_2$; from about 0 mol % to about 2.2 mol % $B_2O_3$; from about 0 mol % to about 1 mol % $Na_2O$; from about 0 mol % to about 1 mol % $K_2O$; from about 0 mol % to about 1 mol % $ZrO_2$; from about 0 mol % to about 4 mol % $P_2O_5$; from about 0 mol % to about 0.1 mol % $Fe_2O_3$; from about 0 mol % to about 1.5 mol % MnOx; and from about 0.08 mol % to about 0.16 mol % $SnO_2$.

In one or more embodiments, the composition may include from about 70 mol % to 75 mol % $SiO_2$; from about 10 mol % to about 15 mol % $Al_2O_3$; from about 5 mol % to about 13 mol % $Li_2O$; from about 0 mol % to about 4 mol % ZnO; from about 0.1 mol % to about 8 mol % MgO; from about 0 mol % to about 5 mol % $TiO_2$; from about 0.1 mol % to about 4 mol % $B_2O_3$; from about 0.1 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % MnOx; and from about 0.05 mol % to about 0.2 mol % $SnO_2$.

In one or more embodiments, the composition may include from about 52 mol % to about 65 mol % $SiO_2$; from about 14 mol % to about 18 mol % $Al_2O_3$; from about 5.5 mol % to about 7 mol % $Li_2O$; from about 1 mol % to about 2 mol % ZnO; from about 0.01 mol % to about 2 mol % MgO; from about 4 mol % to about 12 mol % $Na_2O$; from about 0.1 mol % to about 4 mol % $P_2O_5$; and from about 0.01 mol % to about 0.16 mol % $SnO_2$. In some embodiments, the composition may be free, or substantially free, of any one or more of $B_2O_3$, $TiO_2$, $K_2O$ and $ZrO_2$.

In one or more embodiments, the composition may include 0.5 or more mol % $P_2O_5$, $Na_2O$ and, optionally, $Li_2O$, where $Li_2O$ (mol %)/$Na_2O$ (mol %)<1. In addition, these compositions may be free, or substantially free, of $B_2O_3$ and $K_2O$. In some embodiments, the composition may include ZnO, MgO, and $SnO_2$.

In some embodiments, the composition may comprise: from about 58 mol % to about 65 mol % $SiO_2$; from about 11 mol % to about 19 mol % $Al_2O_3$; from about 0.5 mol % to about 3 mol % $P_2O_5$; from about 6 mol % to about 18 mol % $Na_2O$; from 0 mol % to about 6 mol % MgO; and from 0 mol % to about 6 mol % ZnO. In certain embodiments, the composition may comprise from about 63 mol % to about 65 mol % $SiO_2$; from 11 mol % to about 17 mol % $Al_2O_3$; from about 1 mol % to about 3 mol % $P_2O_5$; from about 9 mol % to about 20 mol % $Na_2O$; from 0 mol % to about 6 mol % MgO; and from 0 mol % to about 6 mol % ZnO.

In some embodiments, the composition may include the following compositional relationships $R_2O$ (mol %)/$Al_2O_3$ (mol %)<2, where $R_2O=Li_2O+Na_2O$. In some embodiments, 65 mol %<$SiO_2$ (mol %)+$P_2O_5$ (mol %)<67 mol %. In certain embodiments, $R_2O$ (mol %)+R'O (mol %)-$Al_2O_3$ (mol %)+$P_2O_5$ (mol %)>−3 mol %, where $R_2O=Li_2O+Na_2O$ and R'O is the total amount of divalent metal oxides present in the composition.

In one or more embodiments, the composition may specifically include: from about 68 mol % to 75 mol % $SiO_2$; from about 0.5 mol % to about 5 mol % $B_2O_3$; from about 2 mol % to about 10 mol % $Li_2O$; from about 1 mol % to about 4 mol % MgO; a ratio of $Li_2O$ to $R_2O$ is greater than 0.5 and less than or equal to 1, wherein $R_2O$ is the sum (mol. %) of $Li_2O$, $K_2O$, and $Na_2O$ in the glass substrate; and the glass substrate is substantially free of $TiO_2$. Some embodiments of this paragraph may further include any one or more of the following: 5 mol. % to about 28 mol. % $Al_2O_3$; 0 mol. % to about 6 mol. % $Na_2O$; be substantially free of $ZrO_2$; have a difference between $R_2O$ and $Al_2O_3$ is from about −5 to about 0; have a difference between $R_xO$ and $Al_2O_3$ is from about 0 to about 3, wherein $R_xO$ is the sum (mol. %) of BaO, CaO, MgO, PbO, SrO, ZnO, $Li_2O$, $K_2O$, and $Na_2O$ in the glass substrate; have a ratio of MgO to RO is from about 0 to about 2, wherein RO is the sum (mol. %) of BaO, CaO, MgO, PbO, SrO, and ZnO in the glass substrate;

In one or more embodiments, the composition may specifically include: about 45 mol. % to about 80 mol. % $SiO_2$; from about 5 mol. % to about 28 mol. % $Al_2O_3$; from about 0.5 mol. % to about 5 mol. % $B_2O_3$; from about 1 mol. % to about 4 mol. % MgO; and from about 2 mol. % to about 10 mol. % $Li_2O$, wherein: a difference between $R_2O$ and $Al_2O_3$ is from about −5 to about 0, wherein $R_2O$ is the sum (mol. %) of $Li_2O$, $K_2O$, and $Na_2O$ in the glass substrate; and the glass substrate is substantially free of $TiO_2$. Some embodiments of this paragraph may further include any one or more of the following: $SiO_2$ is present in an amount from about 68 mol. % to about 75 mol. %; $Al_2O_3$ is present in an amount from about 5 mol. % to about 20 mol. %; from about 0 mol. % to about 6 mol. % $Na_2O$; the glass is substantially free of $ZrO_2$; a ratio of $Li_2O$ to $R_2O$ is greater than 0.5 and less than or equal to 1; a difference between $R_xO$ and $Al_2O_3$ is from about 0 to about 3, wherein $R_xO$ is the sum (mol. %) of BaO, CaO, MgO, PbO, SrO, ZnO, $Li_2O$, $K_2O$, and $Na_2O$ in the glass substrate; a ratio of MgO to RO is from about 0 to about 2, wherein RO is the sum (mol. %) of BaO, CaO, MgO, PbO, SrO, and ZnO in the glass substrate.

In one or more embodiments, the composition may specifically include: from about 68 mol. % to about 75 mol. % $SiO_2$; from about 5 mol. % to about 28 mol. % $Al_2O_3$; from about 0.5 mol. % to about 5 mol. % $B_2O_3$; from about 1 mol. % to about 4 mol. % MgO; from about 2 mol. % to about 10 mol. % $Li_2O$, wherein: a difference between $R_xO$ and $Al_2O_3$ is from about 0 to about 3, wherein $R_xO$ is the sum (mol. %) of BaO, CaO, MgO, PbO, SrO, ZnO, $Li_2O$, $K_2O$, and $Na_2O$ in the glass; and the glass substrate is substantially free of $TiO_2$. Some embodiments of this paragraph may further include any one or more of the following: $Al_2O_3$ is present in an amount from about 5 mol. % to about 20 mol. %; from about 0 mol. % to about 6 mol. % $Na_2O$; the glass is substantially free of $ZrO_2$; a difference between $R_2O$ and $Al_2O_3$ is from about −5 to about 0; a ratio of MgO to RO is from about 0 to about 2, wherein RO is the sum (mol. %) of BaO, CaO, MgO, PbO, SrO, and ZnO in the glass substrate; a ratio of $Li_2O$ to $R_2O$ is greater than 0.5 and less than or equal to 1.

In one or more embodiments, the composition may specifically include: from about 68 mol. % to about 75 mol. % $SiO_2$; from about 5 mol. % to about 28 mol. % $Al_2O_3$; from about 0.5 mol. % to about 5 mol. % $B_2O_3$; from about 1 mol. % to about 4 mol. % MgO; and from about 2 mol. % to about 10 mol. % $Li_2O$, wherein: a ratio of MgO to RO is from about 0 to about 2, wherein RO is the sum (mol. %) of BaO, CaO, MgO, PbO, SrO, and ZnO in the glass; and the glass is substantially free of $TiO_2$. Some embodiments of this paragraph may further include any one or more of the following: $Al_2O_3$ is present in an amount from about 5 mol. % to about 20 mol. %; from about 0 mol. % to about 6 mol. % $Na_2O$; the glass is substantially free of $ZrO_2$; a difference between $R_2O$ and $Al_2O_3$ is from about −5 to about 0; a difference between $R_xO$ and $Al_2O_3$ is from about 0 to about 3, wherein $R_xO$ is the sum (mol. %) of BaO, CaO, MgO, PbO, SrO, ZnO, $Li_2O$, $K_2O$, and $Na_2O$ in the glass a ratio of $Li_2O$ to $R_2O$ is greater than 0.5 and less than or equal to 1.

In one or more embodiments, the composition may specifically include: from about 60 mol. % to about 70 mol. % $SiO_2$; from about 2 mol. % to about 4 mol. % MgO; and from about 2 mol. % to about 10 mol. % $Li_2O$, wherein: a ratio of $Li_2O$ to $R_2O$ is greater than 0.5 and less than or equal to 1, wherein $R_2O$ is the sum (mol. %) of $Li_2O$, $K_2O$, and $Na_2O$ in the glass; and the glass is substantially free of $TiO_2$. Some embodiments of this paragraph may further include any one or more of the following: from about 5 mol. % to about 28 mol. % $Al_2O_3$; $Al_2O_3$ is present in an amount from about 5 mol. % to about 20 mol. % from about 0 mol. % to about 8 mol. % $B_2O_3$; from about 0 mol. % to about 6 mol. % $Na_2O$; from about 1 mol. % to about 2 mol. % CaO; the glass is substantially free of $ZrO_2$; a difference between $R_2O$ and $Al_2O_3$ is from about −5 to about 0; a ratio of MgO to RO is from about 0 to about 2, wherein RO is the sum (mol. %) of BaO, CaO, MgO, PbO, SrO, and ZnO in the glass; form about 0 mol. % to about 2 mol. % $SnO_2$.

In one or more embodiments, the composition may specifically include: from about 60 mol. % to about 70 mol. % $SiO_2$; from about 5 mol. % to about 28 mol. % $Al_2O_3$; less than about 5 mol. % MgO; and from about 2 mol. % to about 10 mol. % $Li_2O$, wherein: a difference between $R_xO$ and $Al_2O_3$ is from about 0 to about 3, wherein $R_xO$ is the sum (mol. %) of BaO, CaO, MgO, PbO, SrO, ZnO, $Li_2O$, $K_2O$, and $Na_2O$ in the glass; and the glass is substantially free of $TiO_2$. Some embodiments of this paragraph may further include any one or more of the following: from about 5 mol. % to about 20 mol. % $Al_2O_3$; from about 0.1 mol. % to about 4 mol. % $B_2O_3$; the glass is substantially free of $B_2O_3$; from about 0 mol. % to about 6 mol. % $Na_2O$; from about 0 mol. % to about 2 mol. % ZnO; the glass is substantially free of $ZrO_2$; a ratio of MgO to RO is from about 0 to about 2, wherein RO is the sum (mol. %) of BaO, CaO, MgO, PbO, SrO, and ZnO in the glass substrate; form about 0 mol. % to about 2 mol. % $SnO_2$; from about 0.1 mol. % to about 10 mol. % $P_2O_5$.

In one or more embodiments, the composition may specifically include: $SiO_2$ in an amount from about 60 to about 72; $Al_2O_3$ in an amount from about 6 to about 10; a total amount of MgO+CaO+ZnO is from about 0.1 to about 8; a total amount of $Li_2+Na_2O+K_2O$ is from about 5 to about 15; $Li_2O$ in an amount from about 6 to about 10; $Na_2O$ in an amount from about 0 to about 10; $K_2O$ in an amount of less than about 2; and $ZrO_2$ in an amount of about 0.1 to about 1, wherein: the glass composition is substantially free of $Ti_2O$; the glass composition is substantially free of $Fe_2O_3$; and a ratio of $Li_2O$ to $(Li_2O+Na_2O+K_2O)$ is from about 0.5 to about 1. Some embodiments of this paragraph may further include any one or more of the following: the glass composition is substantially free of $B_2O_3$; the glass composition comprises $Na_2O$ in an amount from about 0.1 to about 6; the glass composition comprises ZnO in an amount from about 0 to about 3; the glass composition comprises CaO in an amount from about 0 to about 5; a ratio of the amount of MgO (in mol %) to a total amount of RO (in mol %) is from about 0 to about 2.

In one or more embodiments, the composition may specifically include: $SiO_2$ in an amount from about 60 to about 72; $Al_2O_3$ in an amount from about 6 to about 10; a total amount of MgO+CaO+ZnO is from about 0.1 to about 8; a total amount of $Li_2+Na_2O+K_2O$ is from about 5 to about 15; $Li_2O$ in an amount from about 6 to about 10; $Na_2O$ in an amount from about 0 to about 10; $K_2O$ in an amount of less than about 2; and $ZrO_2$ in an amount of about 0.1 to about 1, wherein: the glass substrate is substantially free of $Ti_2O$; the glass substrate is substantially free of $Fe_2O_3$; and a ratio of $Li_2O$ to $(Li_2O+Na_2O+K_2O)$ is from about 0.5 to about 1. Some embodiments of this paragraph may further include any one or more of the following: the glass composition is ion-exchangeable and is amorphous; the composition is substantially free of $B_2O_3$; $Na_2O$ in an amount from about 0.1 to about 6; ZnO in an amount from about 0 to about 3; CaO in an amount from about 0 to about 5; a ratio of the amount of MgO (in mol %) to a total amount of RO (in mol %) is from about 0 to about 2.

In one or more embodiments, the composition may specifically include: $SiO_2$ in an amount from about 60 to about 70; $Al_2O_3$ in an amount from about 6 to about 10; a total amount of MgO+CaO+ZnO is a non-zero amount up to about 15 mol %; a total amount of $Li_2O+Na_2O+K_2O$ is from about 5 to about 15; $Li_2O$ in an amount from about 6 to about 10; $Na_2O$ in an amount from about 0 to about 10; $K_2O$ in an amount of less than about 2; and $ZrO_2$ in an amount of about 0.1 to about 1, wherein: the composition is substantially free of $Ti_2O$; the composition is substantially free of $Fe_2O_3$; and a ratio of MgO (mol %) to RO (mol %) is from about 0 to about 2 where RO is the sum (mol %) of BaO, CaO, MgO, PbO, SrO, and ZnO in the glass. Some embodiments of this paragraph may further include any one or more of the following: the glass is ion-exchangeable and is amorphous; the composition is substantially free of $B_2O_3$; $Na_2O$ in an amount from about 0.1 to about 6; ZnO in an amount from about 0 to about 3; CaO in an amount from about 0 to about 5; the total amount of MgO+CaO+ZnO is a non-zero amount up to about 12 mol %.

In one or more embodiments, the composition may specifically include: $SiO_2$ in an amount from about 60 to about 70; $Al_2O_3$ in an amount from about 6 to about 10; the total amount of MgO+CaO+ZnO is a non-zero amount up to about 15 mol %; the total amount of $Li_2O+Na_2O+K_2O$ is from about 5 to about 15; $Li_2O$ in an amount from about 6 to about 10; $Na_2O$ in an amount from about 0 to about 10; $K_2O$ in an amount of less than about 2; and $ZrO_2$ in an amount of about 0.1 to about 1, wherein: the composition is substantially free of $Ti_2O$; and the composition is substantially free of $Fe_2O_3$. Some embodiments of this paragraph may further include any one or more of the following: the $Na_2O$ concentration varies along the depth of a glass substrate made therefrom; the glass is ion-exchangeable and is amorphous; the composition is substantially free of $B_2O_3$; $Na_2O$ in an amount from about 0.1 to about 6; ZnO in an amount from about 0 to about 3; CaO in an amount from about 0 to about 5; the total amount of MgO+CaO+ZnO is a non-zero amount up to about 14 mol %.

In one or more specific embodiments, the glass-based substrates can have a nominal composition before exchange about 63.60 mol % $SiO_2$, 15.67 mol % $Al_2O_3$, 6.24 mol % $Li_2O$, 10.81 mol % $Na_2O$, 1.16 mol % ZnO, 2.48 mol % $P_2O_5$, and 0.04 mol % $SnO_2$.

Where the glass-based substrate includes a glass-ceramic, the crystal phases may include β-spodumene, rutile, gahnite or other known crystal phases and combinations thereof. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, ZnO—$Al_2O_3$-$nSiO_2$ (i.e. ZAS system), and/or glass-ceramics that include a predominant crystal phase including β-quartz solid solution, β-spodumene, cordierite, and lithium disilicate, for example.

The glass-based article and/or glass-based substrate may be substantially planar, although other embodiments may utilize a curved or otherwise shaped or sculpted substrate. In some instances, the glass-based article and/or glass-based substrate may have a 3D or 2.5D shape. The glass-based article and/or glass-based substrate may be substantially optically clear, transparent and free, or substantially free, from light scattering. The glass-based article and/or glass-based substrate may have a refractive index in the range from about 1.45 to about 1.55. As used herein, the refractive index values are with respect to a wavelength of 550 nm.

Additionally or alternatively, the thickness of the glass-based article and/or glass-based substrate may be constant along one or more dimension or may vary along one or more of its dimensions for aesthetic and/or functional reasons. For example, the edges of the glass-based article and/or glass-based substrate may be thicker as compared to more central regions of the glass-based article and/or glass-based substrate. The length, width and thickness dimensions of the glass-based article and/or glass-based substrate may also vary according to the article application or use.

The glass-based substrate may be characterized by the manner in which it is formed. For instance, where the glass-based substrate may be characterized as float-formable (e.g., formed by a float process), rollable, down-drawable and, in particular, fusion-formable or slot-drawable (e.g., formed by a down draw process such as a fusion draw process or a slot draw process).

A float-formable glass-based substrate may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass glass-based substrate can be cooled further and annealed to reduce internal stress. Where the glass-based substrate is a glass ceramic, the glass-based substrate formed from the float process may be subjected to a ceramming process by which one or more crystalline phases are generated.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based article with a surface that has been lapped and polished. Down-drawn glass-based substrates may be drawn to a thickness of less than about 3 mm. In addition, down drawn glass-based articles have a very flat, smooth surface that can be used in its final application without costly grinding and polishing. Where the glass-based article is a glass ceramic, the glass-based article formed from the down draw process may be subjected to a ceramming process by which one or more crystalline phases are generated.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact. Where the glass-based article is a glass ceramic, the glass-based substrate formed from the fusion process may be subjected to a ceramming process by which one or more crystalline phases are generated.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass-based substrate and into an annealing region.

The glass-based substrate may be acid polished or otherwise treated to remove or reduce the effect of surface flaws.

Figure 10:
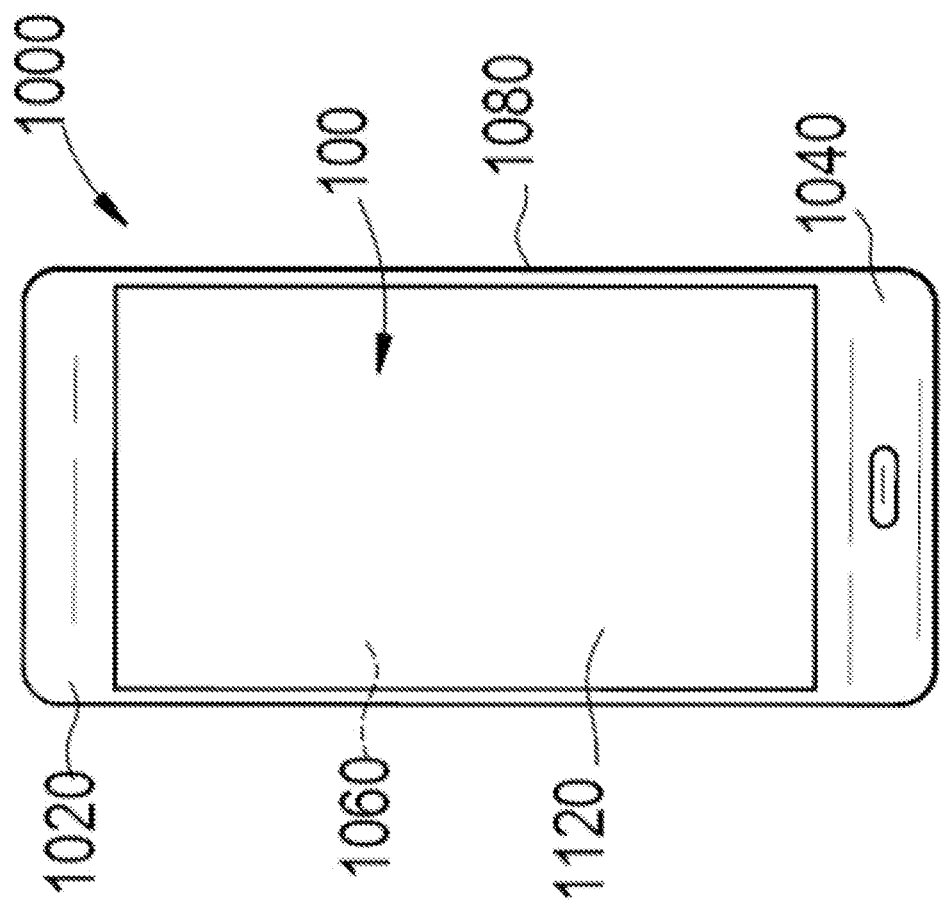
FIG. 10 is a front plan view of an electronic device incorporating one or more embodiments of the glass-based articles described herein.

Some embodiments of this disclosure pertains to devices that include the glass-based articles described herein. For example, the devices may include any device including a display. In one or more embodiments the devices are electronic devices, which can include mobile devices such as mobile phones, laptops, tablets, mp3 players, watches, navigation devices and the like, or stationary devices such as computers, electronic displays, in vehicle information/entertainment systems, billboards, point of sale systems, navigation systems, and the like). In some embodiments, the glass-based articles described herein may be incorporated into architectural articles (walls, fixtures, panels, windows, etc.), transportation articles (e.g., glazing or interior surfaces in automotive applications, trains, aircraft, sea craft, etc.), appliances (e.g., washers, dryers, dishwashers, refrigerators and the like), or any article that would benefit from some fracture resistance. As shown in FIG. 10, an electronic device 1000 may include a glass-based article 100 according to one or more embodiments described herein. The device 1000 includes a housing 1020 having front 1040, back 1060, and side surfaces 1080; electrical components (not shown) that are at least partially inside or entirely within the housing and including at least a controller, a memory, and a display 1120 at or adjacent to the front surface of the housing. The glass-based article 100 is shown as a cover disposed at or over the front surface of the housing such that it is over the display 1120. In some embodiments, the glass-based article may be used as a back cover.

Some embodiments of this disclosure pertain to a method of forming a glass-based article. The method includes providing a glass-based substrate having a first surface and a second surface defining a thickness of about 3 millimeter or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter) and generating a stress profile in the glass-based substrate, as described herein (as shown in FIG. 3 or FIG. 4) to provide the fracture-resistant glass-based article. In one or more embodiments, generating the stress profile comprises ion exchanging a plurality of alkali ions into the glass-based substrate to form a non-zero alkali metal oxide concentration that varies along a substantial portion of the thickness (as described herein) or along the entire thickness. In one example, generating the stress profile includes immersing the glass-based substrate in a molten salt bath including nitrates of Na+, K+, Rb+, Cs+, or a combination thereof, having a temperature of about 350° C. or greater (e.g., about 350° C. to about 500° C.). In one example, the molten bath may include $NaNO_3$, $KNO_3$ or a combination thereof, and may have a temperature of about 485° C. or less. In another example, the bath may include a mixture of $NaNO_3$ and $KNO_3$ and have a temperature of about 460° C. The glass-based substrate may be immersed in the bath for about 2 hours or more, up to about 48 hours (e.g., from about 2 hours to about 10 hours, from about 2 hours to about 8 hours, from about 2 hours to about 6 hours, from about 3 hours to about 10 hours, or from about 3.5 hours to about 10 hours).

In some embodiments, the method may include chemically strengthening or ion exchanging the glass-based substrate in a single bath or in more than one step using successive immersion steps in more than one bath. For example, two or more baths may be used successively. The composition of the one or more baths may include a single metal (e.g., Ag+, Na+, K+, Rb+, Cs+) or a combination of metals in the same bath. When more than one bath is utilized, the baths may have the same or different composition and/or temperature as one another. The immersion times in each such bath may be the same or may vary to provide the desired stress profile.

In one or more embodiments of the method, a second bath or subsequent baths may be utilized to generate a greater surface CS. In some instances, the method includes immersing the glass-based substrate in the second or subsequent baths to generate a greater surface CS, without significantly influencing the chemical depth of layer and/or the DOC. In such embodiments, the second or subsequent bath may include a single metal (e.g., $KNO_3$ or $NaNO_3$) or a mixture of metals ($KNO_3$ and $NaNO_3$). The temperature of the second or subsequent bath may be tailored to generate the greater surface CS. In some embodiments, the immersion time of the glass-based substrate in the second or subsequent bath may also be tailored to generate a greater surface CS without influencing the chemical depth of layer and/or the DOC. For example, the immersion time in the second or subsequent baths may be less than 10 hours (e.g., about 8 hours or less, about 5 hours or less, about 4 hours or less, about 2 hours or less, about 1 hour or less, about 30 minutes or less, about 15 minutes or less, or about 10 minutes or less).

In one or more alternative embodiments, the method may include one or more heat treatment steps which may be used in combination with the ion-exchanging processes described herein. The heat treatment includes heat treating the glass-based article to obtain a desired stress profile. In some embodiments, heat treating includes annealing, tempering or heating the glass-based substrate to a temperature in the range from about 300° C. to about 600° C. The heat treatment may last for 1 minute up to about 18 hours. In some embodiments, the heat treatment may be used after one or more ion-exchanging processes, or between ion-exchanging processes.

Embodiments of the disclosure pertain to glass based articles and methods for their manufacture that provide significantly high stress at deep regions of the stress profile. In one or more embodiments, the diffusion of potassium (K) and sodium (Na) in a four ion interaction where K, Li, Na and will interact near the surface to provide unique stress profiles and glass-based articles with improved drop resistance compared articles that do not have the stress profile shown in FIGS. 3 and 4. Since potassium (K) is very slow and with lower diffusion coefficient it will be mostly present in the near surface, while sodium (Na) will be present in the surface and also in the glass interior with lithium (Li) permeating the glass at different levels. In addition to providing improved stress profiles and drop-induced fracture performance, according to one or more embodiments, glass-based articles may also have antimicrobial properties.

According to one or more embodiments, it is possible to further tailor the stress profile shape by using different Na/K ratios and different relative duration of ion exchange in ion exchange steps. In specific embodiments, a high compressive stress near the surface may not be needed, which allows the additional tailoring of the stress profile to use the stress near the surface more towards the center of the substrate in the form of a buried peak. This can be achieved while still maintaining a very deep DOC where the stress is zero inside the sample. A particular case where this would be applicable would be the case of glasses having a coating, in particular a scratch resistant coating on one or both surfaces that define the thickness. Since the coating can protect the glass-based substrate to an extent, the stress at the near surface can now be used elsewhere inside the glass.

Figure 9:
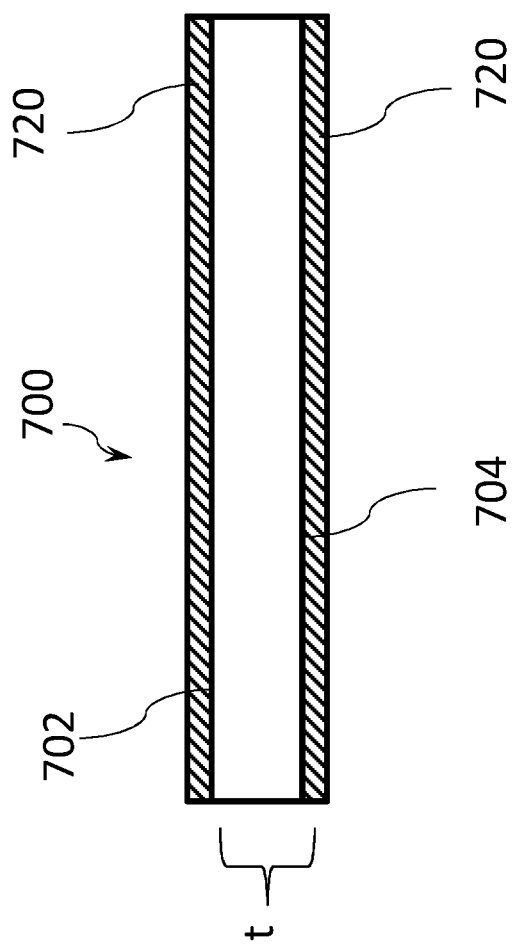
FIG. 9 is a view of glass-based substrate having a coating on surfaces defining thickness t.

Thus, in one or more embodiments, the glass-based articles, for example, as shown in FIG. 9, comprise a substrate 700 having a first surface 702 and a second surface 704 defining the thickness t, and a coating 720. The coating may be on the first surface and/or the second surface to protect the glass-based article from damage, such as sharp contact induced fracture and surface scratches. In one or more embodiments, one or more coatings may be applied for other functions such as for a capacitive touch sensor, or other optical qualities. Thus, embodiments of the disclosure pertain to glass-based articles having multiple layers of coatings on the glass-based article. In some embodiments, a multilayer scratch resistant coating (e.g., an 8-layer scratch resistant coating) having a thickness of approximately 2 micrometers is provided, which can be the only coating, which can be combined with other antireflective coatings (for matching reflective index of the coating to the underlying glass-based substrate), or which may be combined with other functional coatings. In one or more embodiments, the scratch-resistant coating has Young's modulus value from 100 GPa to 300 GPa. In one or more embodiments, the scratch resistant coating is selected from $Al_2O_3$, Mn, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

In one or more embodiments an easy-to-clean (ETC) coating is on the first surface and/or second surface of the glass based articles described herein. In one or more embodiments, ETC coating comprises a perfluoroalkyl silane of formula $(R_F)_y$—$SiX_{4-y}$, where y=1, 2 or 3, the $R_F$ group is a perfluoroalkyl group having a carbon chain length of 6-130 carbon atoms from the silicon atom to the end of the chain at its greatest length, and X is —Cl, acetoxy, —$OCH_3$ or $OCH_2H_3$. ETC coatings are applied to minimize and/or prevent stains and/or fingerprints on the glass-based articles.

One or more embodiments of glass compositions described herein can be used to make glass-based articles as described herein, including Examples 1-3 below, as well as the ranges of compositions described herein.

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

Each of the examples below utilized glass-based substrates having a nominal composition of about 63.60 mol % $SiO_2$, 15.67 mol % $Al_2O_3$, 6.24 mol % $Li_2O$, 10.81 mol % $Na_2O$, 1.16 mol % ZnO, 2.48 mol % $P_2O_5$, and 0.04 mol % $SnO_2$. The glass-based substrates had a thickness of 0.8 mm.

Example 1

Figure 2:
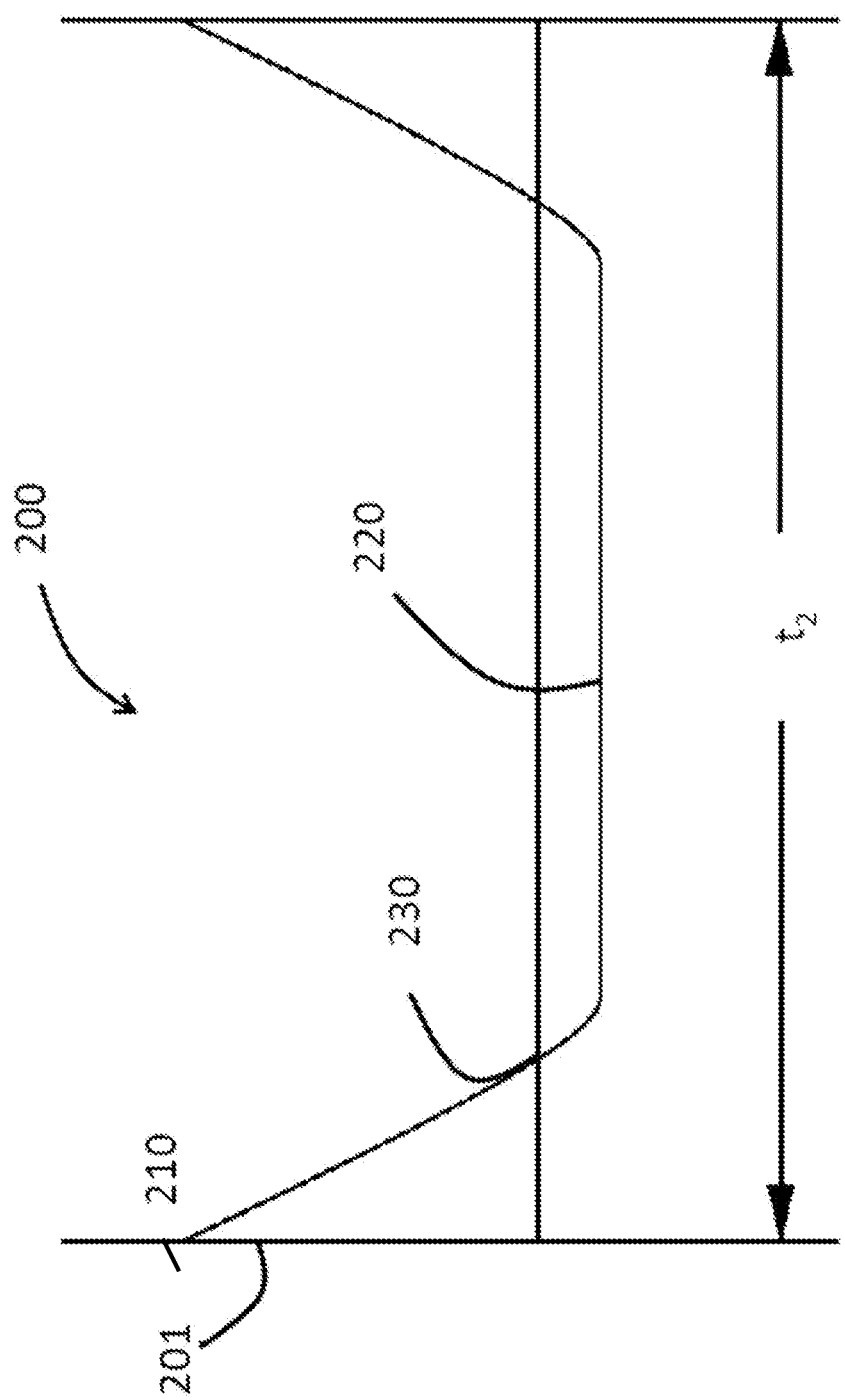
FIG. 2 is a cross-sectional view of a stress profile across a thickness of a known, chemically strengthened glass-based article.

A glass substrate was immersed in a bath containing about 74 wt % $KNO_3$ and 26 wt % $NaNO_3$ at a temperature of 380° C. for a duration of 10 hours. The measured central tension at the center of the substrate was 59.56 MPa. In a second ion exchange step, the glass substrate was immersed in a bath containing 100 wt % $NaNO_3$ at a temperature of 380° C. for a duration of 3 hours. The resulting stress profile is shown in FIG. 3. The measured central tension at the center of the substrate was 59.41 MPa. The first ion-exchange step in the mixed bath created a dual IOX profile due to the diffusion of K and Na simultaneously that resembled the profile in FIG. 2. The second ion-exchange step created a buried peak or hump stress region with a very deep DOC due to the Li and Na diffusion into the glass substrate.

Example 2

A glass substrate was immersed in a bath containing about 74 wt % $KNO_3$ and 26 wt % $NaNO_3$ at a temperature of 380° C. for a duration of 10 hours. In a second ion exchange step, the glass substrate was immersed in a bath containing 100 wt % $NaNO_3$ at a temperature of 380° C. for a duration of 3 hours. In a third ion-exchange step, the glass substrate was immersed in a bath containing 100 wt % $KNO_3$ at a temperature of 380° C. for a duration of 0.2 hours. The resulting stress profile is shown in FIG. 4. The third ion-exchange step created a spike region near the surface. The measured central tension at the center of the substrate was 64.43 MPa.

Comparative Example 3

A glass substrate was immersed in a bath containing about 15 wt % $KNO_3$ and 85 wt % $NaNO_3$ at a temperature of 380° C. for a duration of 3.6 hours. In a second ion exchange step, the glass substrate was immersed in a bath containing 95 wt % $KNO_3$ and 5 wt % $NaNO_3$ at a temperature of 390° C. for a duration of 0.5 hours.

Comparative Example 4

A glass substrate was immersed in a bath containing about 51 wt % $KNO_3$ and 49 wt % $NaNO_3$ at a temperature of 380° C. for a duration of 3.75 hours.

Comparative Example 5

A glass substrate was immersed in a bath containing about 80 wt % $KNO_3$ and 20 wt % $NaNO_3$ at a temperature of 390° C. for a duration of 3 hours.

Comparative Example 6

A glass substrate was immersed in a bath containing about 80 wt % $KNO_3$ and 20 wt % $NaNO_3$ at a temperature of 390° C. for a duration of 7.5 hours.

Example 7—Drop Testing

The Drop Test described above was utilized on substrates made in accordance with Examples 1-2 and Comparative Examples 3-6. FIG. 5 shows the results for 180 grit sandpaper, wherein: Example 1 had an average drop height of 192 cm (above 190 cm) for at least 10 samples, and this drop height is comparable to those of Comparative Examples 3-6; Example 2 had an average drop height of 153 cm (above 150 cm) for at least 10 samples, which appears a bit lower than those of Comparative Examples 3-6; Example 1 had a survival rate of 50% for at least 10 samples in the Drop Test with a max drop height of 225 cm; and Example 2 had a survival rate of 20% for at least 10 samples in the Drop Test with a max drop height of 225 cm. FIG. 6 shows the results for 30 grit sandpaper, wherein: Example 1 had an average drop height of 73 cm (above 70 cm) for at least 4 samples, and this drop height is comparable to those of Comparative Examples 3-6; Example 2 had an average drop height of 45 cm (above 40 cm) for at least 2 samples, which is a bit lower than those of Comparative Examples 3-6; Example 1 had a survival rate of 100% for at least 4 samples wherein maximum drop height is 50 cm. Regarding drop performance, the two-step IOX (Example 1) performs very well, while the three step IOX (Example 2) seemed to not perform as well as the two-step IOX or the comparative examples. However, the three step IOX performed much better (than either Example 1 or Comparative Examples 3-6) in a second set of scratch testing using a 136° 4-sided Diamond tip, as described below and, therefore, is a good tradeoff between drop and scratch resistance for some applications.

Example 7—Scratch Testing

Figure 7A:
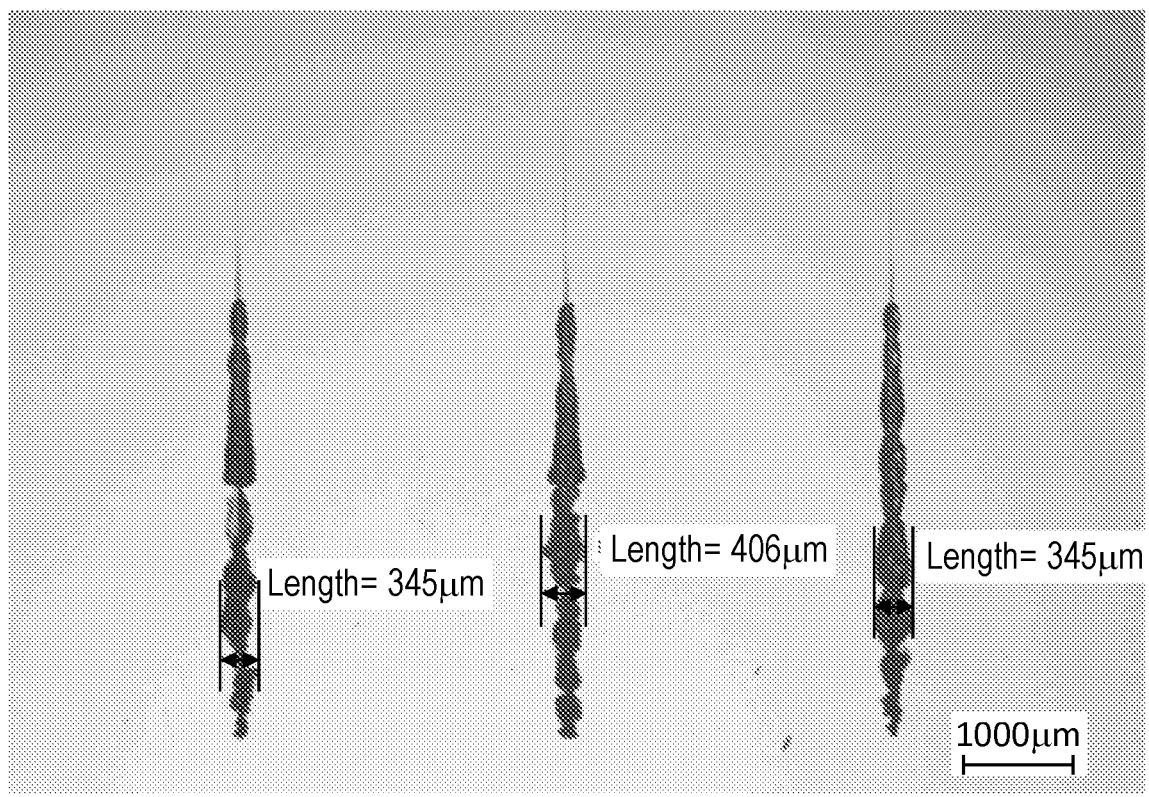
FIGS. 7A-C are images of samples after ramped scratch testing.
Figure 7B:
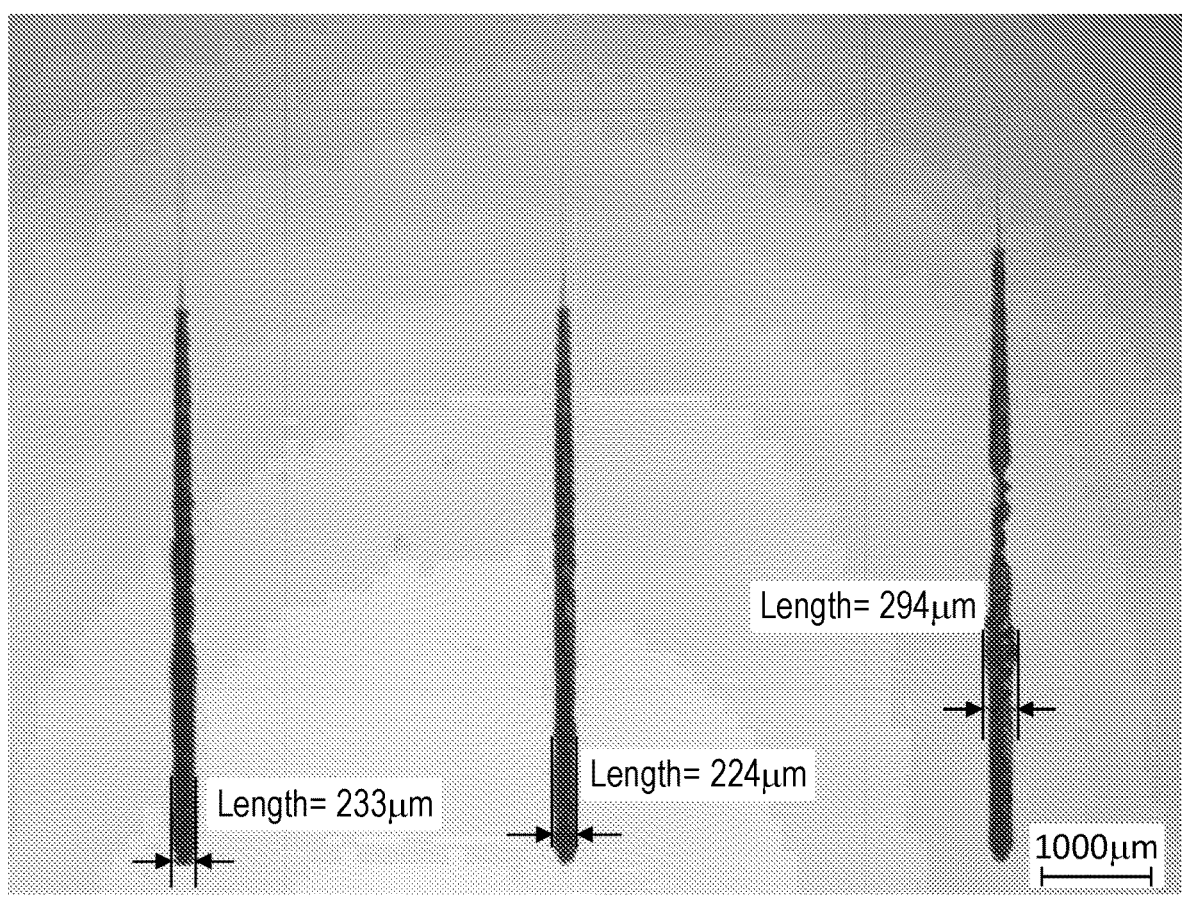
Figure 7C:
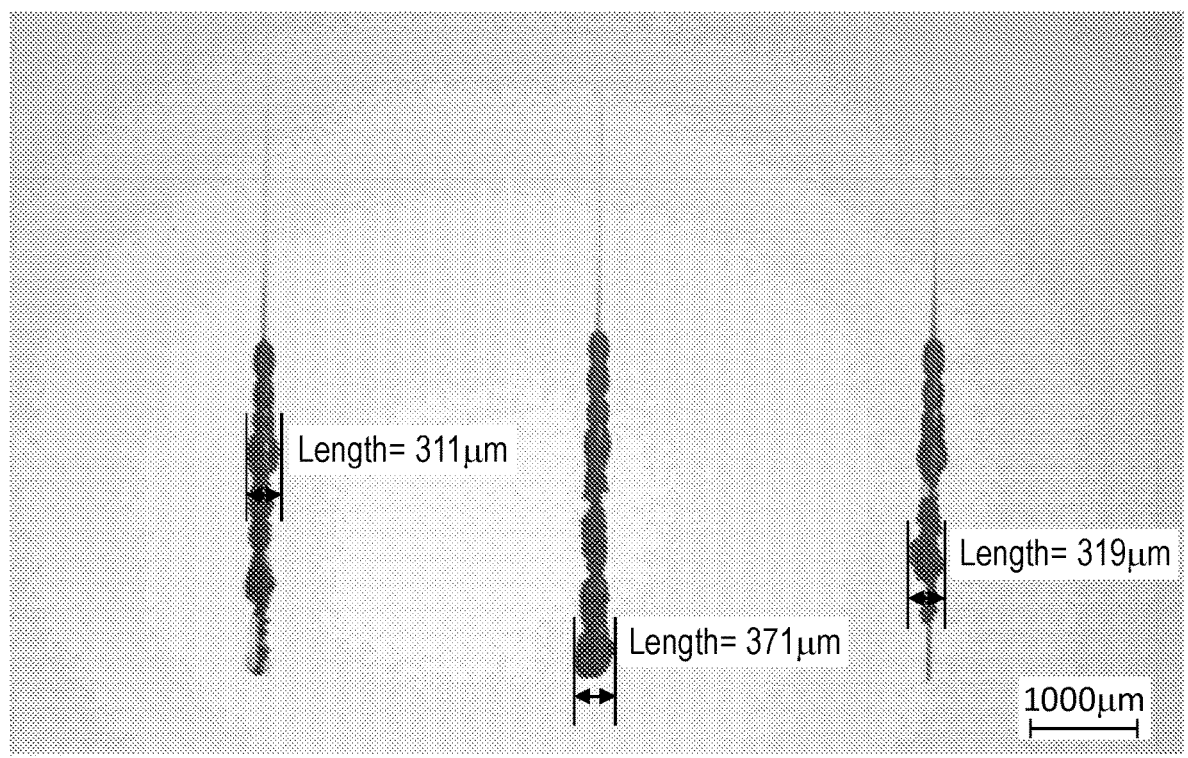

In a first test, ramped scratch tests using a spherical tipped cone profile tip (20 micron diameter of the spherical portion of the conosphere) were performed on Comparative Example 4, Example 1 and Example 2. The load on the tip was linearly ramped from 0 to 2N, over a test duration of 20 seconds. The tip traveled 8 mm, at a rate of 0.4 mm/second, and the load was linearly ramped at a rate of 1N per 10 seconds. The scratch results for Comparative Example 4 are shown in FIG. 7A, the scratch results for Example 1 are shown in FIG. 7B and, the scratch results for Example 2 are shown in FIG. 7C. Examples 1 and 2 outperformed Comparative Example 4, as indicated by the narrower scratch patterns. In FIG. 7A, Comparative Example 4, shows a scratch "length" (horizontal distance between the vertical lines, denoted by double arrow-headed line, at the widest part of the scratch) of 345 microns, 406 microns, and 345 microns, for the three samples. The average scratch length was 365 microns, and the shortest length was 345 microns. In FIG. 7B, Example 1, shows a scratch length of 233 microns, 224 microns, and 294 microns, for the three samples. The average scratch length was 250 microns, and the shortest length was 224 microns. Thus, for example, some embodiments include a scratch length of less than 300 microns, or less than 275 microns, or less than 250 microns, or less than 225 microns. Some embodiments include an average scratch length (with a spherical tipped cone profile tip, with a sample size of 3 or more) of less than 300 microns, or less than 275 microns, or of less than or equal to 250 microns. In FIG. 7C, Example 2, shows a scratch length of 311 microns, 371 microns, and 319 microns, for the three samples. The average scratch length was 334 microns, and the shortest length was 311 microns. Thus, for example, some embodiments include a scratch length of less than 340 microns, or less than 325 microns, or less than 320 microns. Some embodiments include an average scratch length (with a spherical tipped cone profile tip, with a sample size of 3 or more) of less than 350 microns, or less than 340 microns, or of less than or equal to 334 microns. According to the foregoing, Example 1 (FIG. 7B) appeared to provide the best scratch resistance.

Figure 8A:
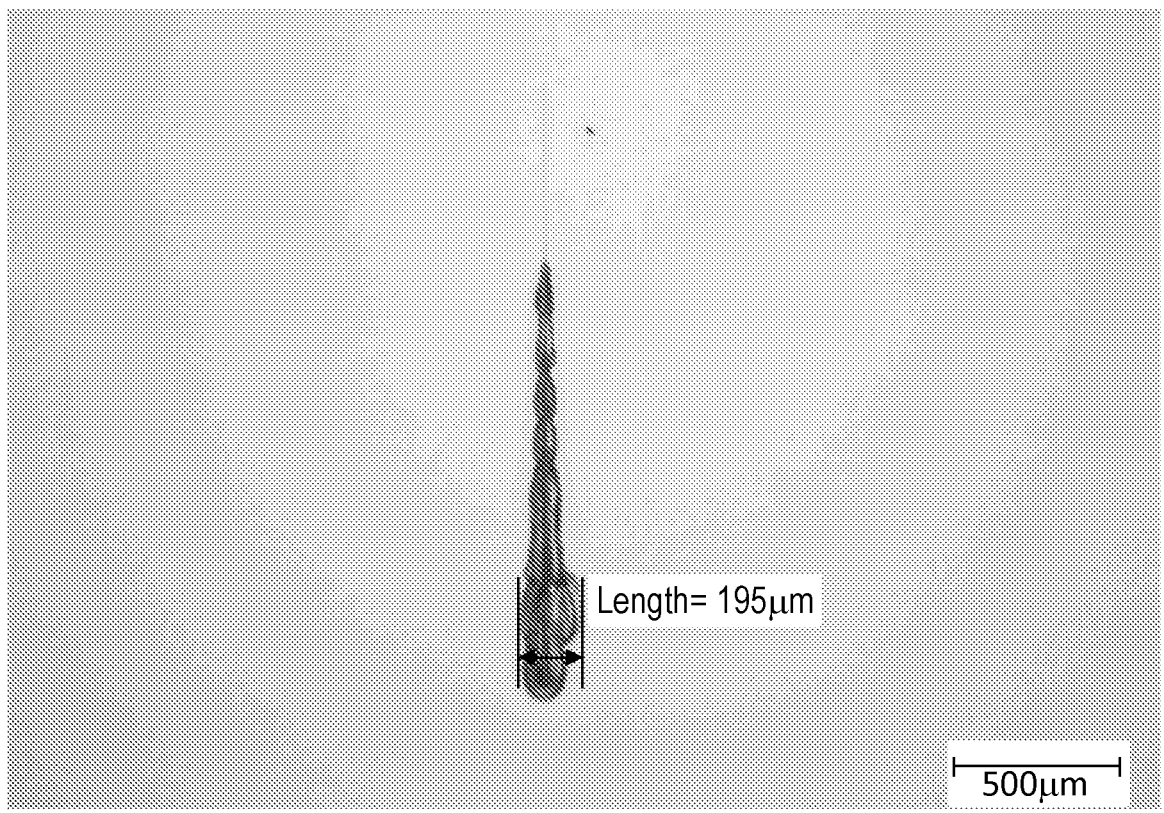
FIGS. 8A-C are images of samples after ramped scratch testing.
Figure 8B:
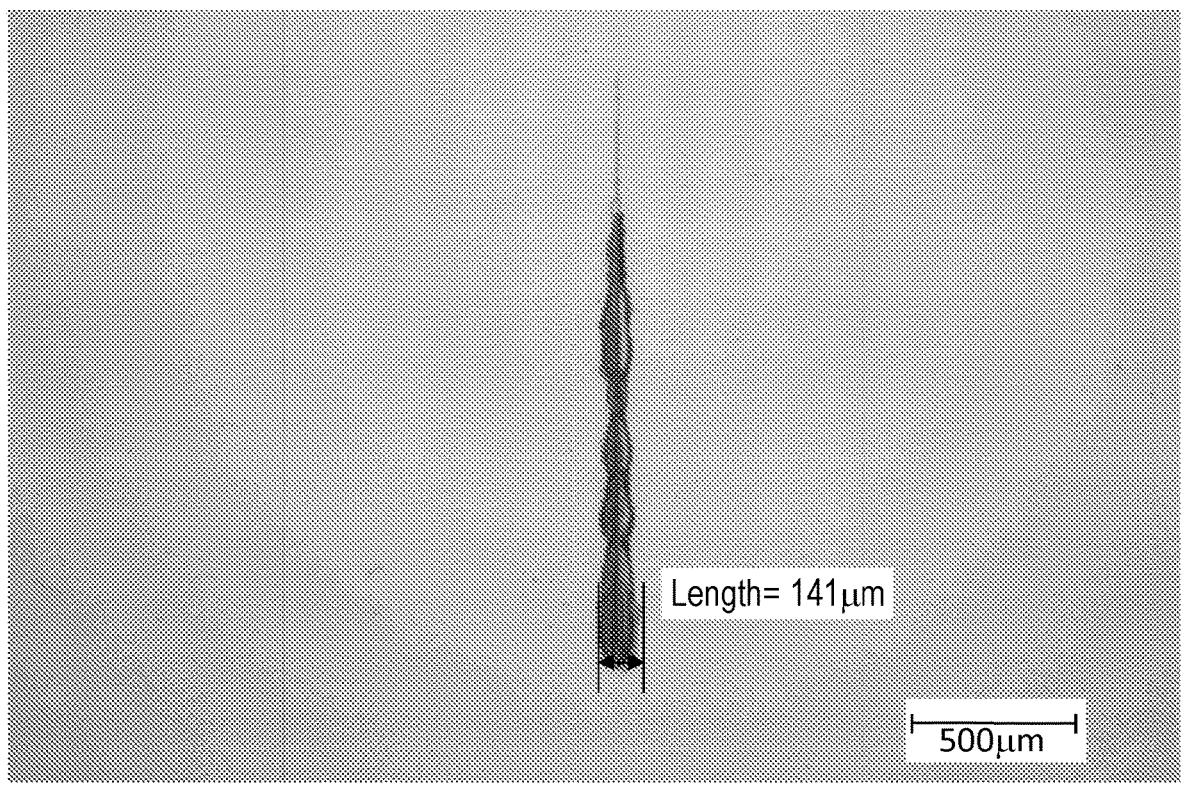
Figure 8C:
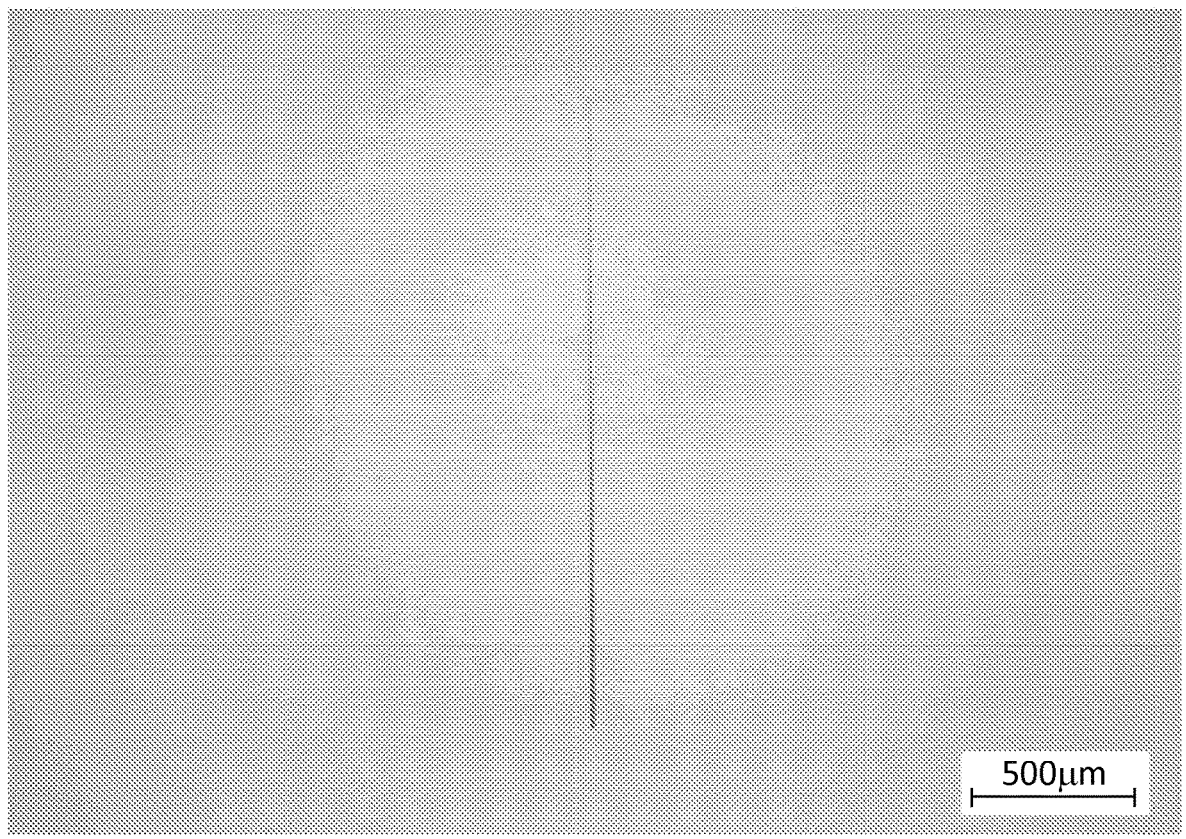

A second set of scratch tests were performed using a 136° 4-sided Diamond tip on Comparative Example 4, Example 1 and Example 2. The load on the tip was linearly ramped from 0 to 0.5N at a rate of 1 N force per 10 seconds. The test duration was 5 seconds, and the tip traveled 2 mm at a rate of 0.4 mm/second. The scratch results for Comparative Example 4 are shown in FIG. 8A, the scratch results for Example 1 are shown in FIG. 8B, and the scratch results for Example 2 are shown in FIG. 8C. FIG. 8A shows that Comparative Example 4 had a scratch length of 195 microns. FIG. 8B shows that FIG. 11B had a scratch length of 141 microns. And FIG. 8C shows that Example 2 did not form cracks under these loads used this ramped test. Here, again both Example 1 and Example 2, with the buried hump stress regions, performed better than Comparative Example 4, as evidenced by narrower (shorter crack "length") cracks. Accordingly, some embodiments include a scratch length (when tested with a 136° 4-sided Diamond tip ramped from 0 to 0.5N at a rate of 1 N force per 10 seconds, over a test duration of 5 seconds at a probe speed of 0.4 mm/second) of less than 190 microns, or of less than 175 microns, or of less than 150 microns, or of less than 145 microns, or of less than 125 microns, or of less than 100 microns, or of less than 75 microns, or of less than 50 microns, or of less than 40 microns, or of less than 30 microns, or of less than 25 microns, or of less than 20 microns, or of less than 15 microns, or of less than 10 microns, or of less than 5 microns, or of less than 4 microns, or of less than 3 microns, or of from 0 to less than 190 microns, or any and all sub-ranges between any of the foregoing values.

It will be apparent to those skilled in the art that various modifications and variations can be made without departing from the spirit or scope of the disclosure. Various exemplary combinations of features are set forth in the following embodiments.

Embodiment 1. A glass-based article comprising:

a first surface and a second surface opposing the first surface defining a thickness (t) and a center between the first surface and the second surface, the glass-based article comprising $Li_2O$, ion-exchanged potassium and ion-exchanged sodium; and a stress profile comprising a hump stress region extending from the first surface (or a point below the first surface) to an apex in a range of 0.001·t and 0.1·t, a compressive stress at the apex in a range of 25 MPa and 750 MPa, wherein at least one point of the stress profile in the hump stress region between the first surface and the apex comprises a tangent having a slope with a value from 25 MPa/micrometer to 500 MPa/micrometer, a decreasing stress region extending from the apex that decreases such that at least one point of the stress profile in the decreasing stress region extending from the apex toward the center comprises a tangent having a slope with a value from −20 MPa/micrometer to −200 MPa/micrometer until the decreasing stress region reaches a depth of compression where the glass-based article has a stress value of zero, the depth of compression being in a rage of 0.1·t and 0.25·t, and a tensile stress region extending from the depth of compression to a maximum tensile stress, wherein the glass-based article comprises a thickness from 0.01 mm to 3 mm.

Embodiment 2. The glass-based article of Embodiment 1, wherein the stress at the apex is a compressive stress from 100 MPa to 300 MPa.

Embodiment 3. The glass-based article of Embodiment 1 or Embodiment 2, wherein there is tensile stress at the first surface, an absolute value of the tensile stress is in a range of from 200 MPa to 0 MPa, and the hump stress region comprises an increasing stress region extending from the first surface to the apex such that at least one point of the stress profile in the increasing stress region extending from the first surface to the apex comprises a tangent having a slope with a value from 20 MPa/micrometer to 200 MPa/micrometer, wherein in the increasing stress region, the stress becomes increasingly compressive.

Embodiment 4. The glass-based article of Embodiment 1 or Embodiment 2, wherein there is compressive stress at the first surface, an absolute value of the compressive stress is from greater than 0 MPa to 750 MPa and the hump stress region comprises an increasing stress region extending from the first surface to the apex such that at least one point of the stress profile in the increasing stress region extending from the first surface to the apex comprises a tangent having a slope with a value from 20 MPa/micrometer to 200 MPa/micrometer, wherein in the increasing stress region, the stress becomes increasingly compressive.

Embodiment 5. The glass-based article of any one of Embodiments 1-4, wherein the hump region extends from a point that is beneath the first surface.

Embodiment 6. The glass-based article of Embodiment 1 or Embodiment 2, the stress profile further comprising a compressive stress layer comprising the ion-exchanged potassium and ion-exchanged sodium, the compressive stress layer defining a surface stress region extending from the first surface to the hump stress region, the surface stress region comprising a compressive stress that decreases in magnitude moving from the first surface such that at least one point of the stress profile in the surface stress region extending from the first surface to a transition with the hump region comprises a tangent having a slope with a value from −25 MPa/micrometer to −200 MPa/micrometer.

Embodiment 7. The glass-based article of Embodiment 6, wherein at least one point of the stress profile of the surface stress region extending from the first surface to a transition with the hump region comprises a tangent having a slope with a value from −30 MPa/micrometer to −170 MPa/micrometer.

Embodiment 8. The glass-based article of Embodiment 6 or Embodiment 7, wherein the compressive stress at the first surface is from 500 MPa to 1500 MPa.

Embodiment 9. The glass-based article of Embodiments 8, wherein the compressive stress at the first surface is from 650 MPa to 1100 MPa.

Embodiment 10. The glass-based article of any one of Embodiments 1-9, wherein $Li_2O$ is present in the glass-based article in a range of 0.1 mol % and 20 mol %.

Embodiment 11. The glass-based article of any one of Embodiments 1-10, wherein $B_2O_3$ is present in the glass-based article in a range of 0.1 mol % and 10 mol %.

Embodiment 12. The glass-based article of any one of Embodiments 1-11, wherein $P_2O_5$ is present in the glass-based article in a range of 0.1 mol % and 10 mol %.

Embodiment 13. The glass-based article of any one of Embodiments 1-12, wherein the glass-based article is free of $K_2O$.

Embodiment 14. The glass-based article of any one of Embodiments 1-13, wherein all points of the stress profile between the apex and the center are in the form a power-law profile comprising a power exponent, wherein the power exponent is from about 1.2 to about 3.4.

Embodiment 15. The glass-based article of any one of Embodiments 1-14, wherein the glass-based article further comprises any one or more of: onto 180 grit sandpaper an average drop height of above 190 cm for at least 10 samples; onto 180 grit sandpaper an average drop height of 192 cm or more for at least 10 samples; a survival rate of 50% or more for at least 10 samples in the Drop Test with a max drop height of 225 cm, onto 180 grit sandpaper; onto 30 grit sandpaper an average drop height of above 70 cm for at least 4 samples; onto 30 grit sandpaper an average drop height of 73 cm or more for at least 4 samples; onto 30 grit sandpaper a survival rate of 100% for at least 4 samples wherein maximum drop height is 50 cm.

Embodiment 16. The glass-based article of any one of Embodiments 1-15, further comprising an average scratch length (with a spherical tipped cone profile tip, with a sample size of 3 or more) of at least one of: (i) less than 300 microns; or (ii) less than 275 microns; or (iii) of less than or equal to 250 microns.

Embodiment 17. The glass-based article of any one of Embodiments 1-16, further comprising an a scratch length (when tested with a 136° 4-sided Diamond tip ramped from 0 to 0.5N at a rate of 1 N force per 10 seconds, over a test duration of 5 seconds at a probe speed of 0.4 mm/second) of at least one of: (i) less than 190 microns; or (ii) of less than 175 microns; or (iii) or of less than 150 microns; or (iv) of less than 145 microns.

Embodiment 18. The glass-based article of any one of Embodiments 1-14, wherein the glass-based article further comprises at least one of: onto 180 grit sandpaper an average drop height above 150 cm for at least 10 samples; onto 180 grit sandpaper an average drop height 153 cm or more for at least 10 samples; a survival rate of 20% or more for at least 10 samples in the Drop Test with a max drop height of 225 cm onto 180 grit sandpaper; onto 30 grit sandpaper an average drop height of above 40 cm for at least 2 samples; and onto 30 grit sandpaper an average drop height of 43 cm or more for at least 2 samples.

Embodiment 19. The glass-based article of any one of Embodiments 1-14, or 18, further comprising an average scratch length (with a spherical tipped cone profile tip, with a sample size of 3 or more) of less than 350 microns, or less than 340 microns, or of less than or equal to 334 microns.

Embodiment 20. The glass-based article of any one of Embodiments 1-14, or 18-19, further comprising further comprising an a scratch length (when tested with a 136° 4-sided Diamond tip ramped from 0 to 0.5N at a rate of 1 N force per 10 seconds, over a test duration of 5 seconds at a probe speed of 0.4 mm/second) of at least one of: (i) less than 190 microns; or (ii) of less than 175 microns; or (iii) of less than 150 microns; or (iv) of less than 145 microns; or (v) of less than 125 microns; or (vi) of less than 100 microns; or (vii) of less than 75 microns; or (viii) of less than 50 microns; or (ix) of less than 40 microns; or (x) of less than 30 microns; or (xi) of less than 25 microns; or (xii) of less than 20 microns; or (xiii) of less than 15 microns; or (xiv) of less than 10 microns; or (xv) of less than 5 microns; or (xvi) of less than 4 microns; or (xvii) of less than 3 microns; or (xviii) of from 0 to less than 190 microns.

Embodiment 21. The glass-based article according to any one of Embodiments 1-20, further comprising a coating on the first surface.

Embodiment 22. The glass-based article according to any one of Embodiments 21, further comprising a coating on the second surface.

Embodiment 23. The glass based article according to Embodiment 21 or Embodiment 22, wherein the coating comprises a scratch-resistant coating.

Embodiment 24. A device comprising:
a housing comprising front, back, and side surfaces;
electrical components that are at least partially inside the housing;
a display at or adjacent to the front surface of the housing; and
a cover substrate disposed over the display, wherein the cover substrate comprises the glass-based article of any one of Embodiments 1-23.

Embodiment 25. A method of making a glass-based article comprising:
ion-exchanging sodium and potassium into a glass-based substrate comprising $Li_2O$ in a range of 0.1 mol % and 20 mol %, so that the glass-based substrate comprises:
a first surface and a second surface opposing the first surface defining a thickness (t) (mm) and a center between the first surface and the second surface; and
a stress profile comprising a hump stress region extending from the first surface (or a point below the first surface) to an apex in a range of 0.001·t and 0.1·t, a compressive stress at the apex is from 25 MPa to 750 MPa, wherein at least one point of the stress profile of the hump region between the first surface and the apex comprises a tangent having a slope with a value from 25 MPa/micrometer and 500 MPa/micrometer, a decreasing stress region extending from the apex that decreases such that at least one point of the stress profile of the decreasing stress region extending from the apex toward the center comprises a tangent having a slope with a value from −20 MPa/micrometer to −200 MPa/micrometer until the decreasing stress region reaches a depth of compression where the glass-based article has a stress value of zero, the depth of compression being in a rage of 0.1·t and 0.25·t, and a tensile stress region extending from the depth of compression to a maximum tensile stress, wherein the glass-based article comprises a thickness from 0.01 mm to 3 mm.

Embodiment 26. The method of Embodiment 25, wherein the stress profile further comprising a compressive stress layer comprising the ion-exchanged potassium and ion-exchanged sodium, the compressive stress layer defining a surface stress region extending from the first surface to the hump stress region, the surface stress region comprising a compressive stress that decreases in magnitude moving from the first surface such that at least one point of the stress profile of the surface stress region extending from the first surface to a transition with the hump region comprises a tangent comprising a slope with a value from −25 MPa/micrometer to −200 MPa/micrometer Embodiment 27. The method of Embodiment 25 or Embodiment 26, further comprising subjecting the glass-based substrate to two ion-exchange processes.

Embodiment 28. The method of any of Embodiments 25 or 26, further comprising subjecting the glass-based substrate to three ion-exchange processes.

What is claimed is:

1. A glass-based article comprising:
a first surface and a second surface opposing the first surface defining a thickness (t) and a center between the first surface and the second surface, the glass-based article comprising $Li_2O$, ion-exchanged potassium and ion-exchanged sodium; and
a stress profile comprising a hump stress region extending from the first surface or a point below the first surface to an apex in a range of 0.001·t and 0.1·t, a compressive stress at the apex in a range of 25 MPa and 750 MPa, wherein at least one point of the stress profile of the hump stress region between the first surface and the apex comprises a tangent having a slope with a value from 25 MPa/micrometer to 500 MPa/micrometer, a decreasing stress region extending from the apex that decreases such that at least one point of the stress profile of the decreasing stress region extending from the apex toward the center comprises a tangent having a slope with a value from −20 MPa/micrometer to −200 MPa/micrometer until the decreasing stress region reaches a depth of compression where the glass-based article has a stress value of zero, the depth of compression being in a range of 0.1·t and 0.25·t, and a tensile stress region extending from the depth of compression to a maximum tensile stress, wherein the glass-based article comprises a thickness from 0.01 mm to 3 mm.

2. The glass-based article of claim 1, wherein the stress at the apex is a compressive stress from 100 MPa to 300 MPa.

3. The glass-based article of claim 1, wherein there is tensile stress at the first surface, an absolute value of the tensile stress is in a range of from 200 MPa to 0 MPa, and the hump stress region comprises an increasing stress region extending from the first surface to the apex such that at least one point of the stress profile of the increasing stress region extending from the first surface to the apex comprises a tangent having a slope with a value from 20 MPa/micrometer to 200 MPa/micrometer, wherein in the increasing stress region, the stress becomes increasingly compressive.

4. The glass-based article of claim 1, wherein there is compressive stress at the first surface, an absolute value of the compressive stress is from greater than 0 MPa to 750 MPa and the hump stress region comprises an increasing stress region extending from the first surface to the apex such that at least one point of the stress profile of the increasing stress region extending from the first surface to the apex comprises a tangent having a slope with a value from 20 MPa/micrometer to 200 MPa/micrometer, wherein in the increasing stress region, the stress becomes increasingly compressive.

5. The glass-based article of claim 1, wherein the hump region extends from a point that is beneath the first surface.

6. The glass-based article of claim 1, the stress profile further comprising a compressive stress layer comprising the ion-exchanged potassium and ion-exchanged sodium, the compressive stress layer defining a surface stress region extending from the first surface to the hump stress region, the surface stress region comprising a compressive stress that decreases in magnitude moving from the first surface such that at least one point of the stress profile of the surface stress region extending from the first surface to a transition with the hump region comprises a tangent having a slope with a value from −25 MPa/micrometer to −200 MPa/micrometer.

7. The glass-based article of claim 6, wherein at least one point of the stress profile of the surface stress region extending from the first surface to a transition with the hump region comprises a tangent having a slope with a value from −30 MPa/micrometer to −170 MPa/micrometer.

8. The glass-based article of claim 7, wherein the compressive stress at the first surface is from 500 MPa to 1500 MPa.

9. The glass-based article of claim 1, wherein $Li_2O$ is present in the glass-based article in a range of 0.1 mol % and 20 mol %.

10. The glass-based article of claim 1, wherein all points of the stress profile between the apex and the center are in the form a power-law profile comprising a power exponent, wherein the power exponent is from about 1.2 to about 3.4.

11. The glass-based article of claim 1, wherein the glass-based article further comprises any one or more of: onto 180 grit sandpaper an average drop height of above 190 cm for at least 10 samples; onto 180 grit sandpaper an average drop height of 192 cm or more for at least 10 samples; a survival rate of 50% or more for at least 10 samples in the Drop Test with a max drop height of 225 cm, onto 180 grit sandpaper; onto 30 grit sandpaper an average drop height of above 70 cm for at least 4 samples; onto 30 grit sandpaper an average drop height of 73 cm or more for at least 4 samples; onto 30 grit sandpaper a survival rate of 100% for at least 4 samples wherein maximum drop height is 50 cm.

12. The glass-based article of claim 1, further comprising an average scratch length (with a spherical tipped cone profile tip, with a sample size of 3 or more) of at least one of: (i) less than 300 microns; or (ii) less than 275 microns; or (iii) of less than or equal to 250 microns.

13. The glass-based article of claim 1, further comprising an a scratch length (when tested with a 136° 4-sided Diamond tip ramped from 0 to 0.5N at a rate of 1 N force per 10 seconds, over a test duration of 5 seconds at a probe speed of 0.4 mm/second) of at least one of: (i) less than 190 microns; or (ii) of less than 175 microns; or (iii) or of less than 150 microns; or (iv) of less than 145 microns.

14. The glass-based article of claim 1, wherein the glass-based article further comprises at least one of: onto 180 grit sandpaper an average drop height above 150 cm for at least 10 samples; onto 180 grit sandpaper an average drop height 153 cm or more for at least 10 samples; a survival rate of 20% or more for at least 10 samples in the Drop Test with a max drop height of 225 cm onto 180 grit sandpaper; onto 30 grit sandpaper an average drop height of above 40 cm for at least 2 samples; and onto 30 grit sandpaper an average drop height of 43 cm or more for at least 2 samples.

15. The glass-based article of claim 1, further comprising an average scratch length (with a spherical tipped cone profile tip, with a sample size of 3 or more) of less than 350 microns, or less than 340 microns, or of less than or equal to 334 microns.

16. The glass-based article of claim 1, further comprising further comprising an a scratch length (when tested with a 136° 4-sided Diamond tip ramped from 0 to 0.5N at a rate of 1 N force per 10 seconds, over a test duration of 5 seconds at a probe speed of 0.4 mm/second) of at least one of: (i) less than 190 microns; or (ii) of less than 175 microns; or (iii) of less than 150 microns; or (iv) of less than 145 microns; or (v) of less than 125 microns; or (vi) of less than 100 microns; or (vii) of less than 75 microns; or (viii) of less than 50 microns; or (ix) of less than 40 microns; or (x) of less than 30 microns; or (xi) of less than 25 microns; or (xii) of less than 20 microns; or (xiii) of less than 15 microns; or (xiv) of less than 10 microns; or (xv) of less than 5 microns; or (xvi) of less than 4 microns; or (xvii) of less than 3 microns; or (xviii) of from 0 to less than 190 microns.

17. The glass-based article according to claim 1, further comprising a coating on the first surface.

18. A device comprising:
a housing comprising front, back, and side surfaces;
electrical components that are at least partially inside the housing;
a display at or adjacent to the front surface of the housing; and
a cover substrate disposed over the display, wherein the cover substrate comprises the glass-based article of claim 1.

19. A method of making a glass-based article comprising:
ion-exchanging sodium and potassium into a glass-based substrate comprising $Li_2O$ in a range of 0.1 mol % and 20 mol %, so that the glass-based substrate comprises:
a first surface and a second surface opposing the first surface defining a thickness (t) (mm) and a center between the first surface and the second surface; and
a stress profile comprising a hump stress region extending from the first surface or a point below the first surface to an apex in a range of 0.001·t and 0.1·t, a compressive stress at the apex is from 25 MPa to 750 MPa, wherein at least one point of the stress profile of the hump region between the first surface and the apex comprises a tangent having a slope with a value from 25 MPa/micrometer and 500 MPa/micrometer, a decreasing stress region extending from the apex that decreases such that at least one point of the stress profile of the decreasing stress region extending from the apex toward the center comprises a tangent having a slope with a value from −20 MPa/micrometer to −200 MPa/micrometer until the decreasing stress region reaches a depth of compression where the glass-based article has a stress value of zero, the depth of compression being in a rage of 0.1·t and 0.25·t, and a tensile stress region extending from the depth of compression to a maximum tensile stress, wherein the glass-based article comprises a thickness from 0.01 mm to 3 mm.

20. The method of claim 19, wherein the stress profile further comprising a compressive stress layer comprising the ion-exchanged potassium and ion-exchanged sodium, the compressive stress layer defining a surface stress region extending from the first surface to the hump stress region, the surface stress region comprising a compressive stress that decreases in magnitude moving from the first surface such that at least one point of the stress profile of the surface stress region extending from the first surface to a transition with the hump region comprises a tangent comprising a slope with a value from −25 MPa/micrometer to −200 MPa/micrometer.

* * * * *

UNITED STATES PATENT AND TRADEMARK OFFICE
CERTIFICATE OF CORRECTION

PATENT NO. : 11,724,965 B2
APPLICATION NO. : 16/964442
DATED : August 15, 2023
INVENTOR(S) : Vitor Marino Schneider et al.

Page 1 of 1

It is certified that error appears in the above-identified patent and that said Letters Patent is hereby corrected as shown below:

In the Claims

In Column 36, Line 17, in Claim 1, delete "a thickness" and insert -- the thickness --.

In Column 36, Line 18, in Claim 2, delete "the stress" and insert -- the compressive stress --.

In Column 37, Line 21, in Claim 13, delete "an a" and insert -- a --.

In Column 37, Lines 42-43, in Claim 16, delete "further comprising further comprising an a" and insert -- further comprising a --.

In Column 38, Lines 26-27, in Claim 19, delete "hump region" and insert -- hump stress region --.

In Column 38, Line 41, in Claim 19, delete "a thickness" and insert -- the thickness --.

Signed and Sealed this
Twenty-eighth Day of October, 2025

John A. Squires
*Director of the United States Patent and Trademark Office*